United States Patent
Gao et al.

(10) Patent No.: US 9,980,262 B2
(45) Date of Patent: May 22, 2018

(54) DATA TRANSMISSION METHOD AND DEVICE

(71) Applicant: China Academy of Telecommunications Technology, Beijing (CN)

(72) Inventors: Xuejuan Gao, Beijing (CN); Yanan Lin, Beijing (CN); Zukang Shen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 27 days.

(21) Appl. No.: 15/104,885

(22) PCT Filed: Dec. 3, 2014

(86) PCT No.: PCT/CN2014/092887
§ 371 (c)(1),
(2) Date: Jun. 15, 2016

(87) PCT Pub. No.: WO2015/090141
PCT Pub. Date: Jun. 25, 2015

(65) Prior Publication Data
US 2016/0323854 A1    Nov. 3, 2016

(30) Foreign Application Priority Data
Dec. 19, 2013  (CN) .......................... 2013 1 0710909

(51) Int. Cl.
*H04W 72/04*  (2009.01)
*H04L 1/18*  (2006.01)
(Continued)

(52) U.S. Cl.
CPC ......... *H04W 72/042* (2013.01); *H04L 1/1822* (2013.01); *H04L 1/1854* (2013.01);
(Continued)

(58) Field of Classification Search
CPC .......... H04W 72/042; H04W 72/1215; H04W 72/085; H04L 1/1896; H04L 5/14;
(Continued)

(56) References Cited

U.S. PATENT DOCUMENTS 8,051,354 B2 * 11/2011 Ma ...................... H04L 1/1819
                                                              375/260
8,498,666 B2 * 7/2013 Sebire ...................... H04L 5/001
                                                              370/351
(Continued)

FOREIGN PATENT DOCUMENTS

| CN | 101695009 | 4/2010 |
| CN | 102647254 | 8/2012 |
| CN | 103095436 | 5/2013 |

OTHER PUBLICATIONS

International Search Report for PCT/CN2014/092887 dated Mar. 17, 2015.
(Continued)

*Primary Examiner* — Mounir Moutaouakil
(74) *Attorney, Agent, or Firm* — Foley and Lardner LLP

(57) ABSTRACT

Disclosed are a data transmission method and device. The method comprises: receiving a PDCCH, wherein the PDCCH comprises an indication domain which can at least indicate different HARQ processes the number of which is a sum of maximum HARQ process numbers of a plurality of carriers, and initial transmission and retransmission of data in the same HARQ process use different carriers; and receiving data scheduled by the PDCCH according to the PDCCH. By means of the present application, transmission carriers during initial transmission and retransmission of data in the same process can be adjusted flexibly, so that, when interferences to some carrier(s) are serious, data transmission in the process is adjusted to a carrier or carriers (Continued)

to which interference conditions are not serious, so as to improve system transmission efficiency.

20 Claims, 5 Drawing Sheets

(51) Int. Cl.
    *H04L 5/14* (2006.01)
    *H04W 72/08* (2009.01)
    *H04W 72/12* (2009.01)
(52) U.S. Cl.
    CPC .......... *H04L 1/1893* (2013.01); *H04L 1/1896* (2013.01); *H04L 5/14* (2013.01); *H04W 72/085* (2013.01); *H04W 72/1215* (2013.01); *H04L 1/1825* (2013.01)
(58) Field of Classification Search
    CPC ... H04L 1/1854; H04L 1/1893; H04L 1/1822; H04L 1/1825
    See application file for complete search history.

(56) References Cited

U.S. PATENT DOCUMENTS

| | | | | |
|---|---|---|---|---|
| 8,553,635 | B2* | 10/2013 | Ahn | H04L 1/0023 370/329 |
| 8,634,368 | B2* | 1/2014 | Han | H04L 5/0023 370/311 |
| 8,780,729 | B2* | 7/2014 | Dalsgaard | H04W 24/00 370/241 |
| 8,891,353 | B2* | 11/2014 | Ebrahimi Tazeh Mahalleh | H04B 7/02 370/208 |
| 8,908,492 | B2* | 12/2014 | Heo | H04L 5/0016 370/208 |
| 8,917,586 | B2* | 12/2014 | Harrison | H04L 1/1692 370/208 |
| 9,031,011 | B2* | 5/2015 | Nishio | H04J 11/00 370/227 |
| 9,143,215 | B2* | 9/2015 | Ebrahimi Tazeh Mahalleh | H04B 7/0613 |
| 9,386,574 | B2* | 7/2016 | Koyanagi | H04L 5/0039 |
| 9,497,775 | B2* | 11/2016 | Chung | H04W 72/1289 |
| 9,571,236 | B2* | 2/2017 | Lin | H04L 1/1861 |
| 9,660,771 | B2* | 5/2017 | Agiwal | H04L 1/1887 |
| 9,661,624 | B2* | 5/2017 | Awad | H04W 72/042 |
| 2010/0260130 | A1 | 10/2010 | Earnshaw et al. | |
| 2012/0257552 | A1 | 10/2012 | Chen et al. | |

OTHER PUBLICATIONS

Li et al., "Control Channel Design for Carrier Aggregation between LTE FDD and LTE TDD Systems", IEEE 2012.

* cited by examiner

DATA TRANSMISSION METHOD AND DEVICE

This application is a US National Stage of International Application No. PCT/CN2014/092887, filed on Dec. 3, 2014, designating the United States, and claiming priority to Chinese Patent Application No. 201310710909.1, filed with the State Intellectual Property Office of People's Republic of China on Dec. 19, 2013 and entitled "Data transmission method and device", the content of which is hereby incorporated by reference in its entirety.

FIELD

The present invention relates to the field of communications and particularly to a data transmission method and apparatus.

BACKGROUND

As the amount of mobile data traffic is constantly growing, spectrum resources become increasingly insufficient, and a demand for the amount of traffic may have been not satisfied using licensed spectrum resources alone for network deployment and traffic transmission, so the transmission can be deployed on unlicensed spectrum resources in a Long Term Evolution (LTE) system to improve the experience of a user and to extend a coverage area.

(1) Downlink Data Transmission Schemes

In the LTE system, a UE operates on only one carrier; and in a Long Term Evolution-Advanced (LTE-A) system, the UE can operate concurrently on N carriers. Downlink data on each of the carriers are retransmitted through scheduling by a Physical Downlink Control Channel (PDCCH), and transmission sub-frames and retransmission configurations (including a transmission bandwidth, a Modulation and Coding Scheme (MCS), and other parameters) of the retransmitted data can be adjusted flexibly by the scheduling PDCCH. Different data transmission is identified by different Hybrid Automatic Repeated Request (HARQ) processes, and initial transmission and retransmission of the same data correspond to the same HARQ process. The HARQ processes on the different carriers are indexed separately, and indicated by an HARQ process number field in Downlink Control Information (DCI) formats for the PDCCH scheduling the carriers.

For a carrier operating in the Frequency Division Duplex (FDD) mode, the maximum number of downlink HARQ processes on each carrier is 8, that is, at most 8 downlink HARQ processes can coexist on an FDD carrier, so that 8 different data transmission processes can coexist, and there are N*8 downlink HARQ processes in total on N FDD carriers. Thus the HARQ process number field in the DCI format of the FDD system includes 3 bits of information, where 8 different combination states of the 3 bits of information indicate process indices of the 8 HARQ processes on a carrier respectively, and the 3-bit HARQ process number field in the DCI format for the PDCCH scheduling the carrier indicates one of the 8 HRAR processes on the carrier, to which the currently scheduled data correspond.

For a carrier operating in the Time Division Duplex (TDD) mode, the maximum number of downlink HARQ processes on each carrier depends upon a TDD uplink/downlink configuration as depicted in Table 1, where multiple carriers are configured or aggregated for the UE, and different TDD uplink/downlink configurations are applied to the multiple carriers; and the TDD uplink/downlink configuration in Table 1 is a downlink reference TDD uplink/downlink configuration of the carrier. If all the TDD uplink/downlink configurations of N aggregated TDD carriers are configured with the TDD uplink/downlink configuration 5, then there will be N*15 downlink HARQ processes in total. Thus there are 4 bits of information in the HARQ process number field in the DCI format of the TDD system, where X combination states among 16 different combination states of the 4 bits of information indicate process indices of X HARQ processes on a TDD carrier respectively, where X<=15; and the 4-bit HARQ process number field in the DCI format for the PDCCH scheduling the carrier indicates one of the X HARQ processes on the carrier, to which the currently scheduled data transmission corresponds.

Moreover for FDD and TDD carriers, there are also a New Data Indicator (NDI) field and a Redundancy Version (RV) field in the DCI format for the PDCCH scheduling the carrier, where the NDI field includes 1 bit of information to indicate whether the current data transmission scheduled by the PDCCH is initial transmission or retransmission, and the RV field includes 2 bits of information to indicate one of the versions 0 to 3, which is applied to the RV of the data for the current transmission scheduled by the PDCCH, where both of these two fields correspond to the HARQ process number field, that is, both of the fields indicate information about the data transmission in the HARQ processes indicated by the HARQ process number filed in the PDCCH.

TABLE 1

Maximum number DL HARQ processes for TDD

| TDD UL/DL configuration | Maximum number of HARQ processes |
| --- | --- |
| 0 | 4 |
| 1 | 7 |
| 2 | 10 |
| 3 | 9 |
| 4 | 12 |
| 5 | 15 |
| 6 | 6 |

(2) Unlicensed Spectrums

The existing spectrums can be categorized into licensed spectrums and unlicensed spectrums, where the licensed spectrums are allocated dedicated spectrums, and interference thereof is substantially predicable; and there are no particular planed systems to which the unlicensed spectrums are applicable, and they can be shared by a number of systems, e.g., LTE, WiFi, etc., so interference thereof may not be predicable, and the transmission performance and the quality of service of data transmission thereof may not be determinate, where if there is low interference, then the transmission performance and the quality of service may be acceptable, and if there is high interference, then the performance of data transmission may be lowered, and the quality of service may be degraded.

Thus if the LTE system operates on an unlicensed spectrum resource, then there may be unpredictable interference so that the performance of data transmission on a carrier operating on the unlicensed spectrum resource may be poor, thus discouraging the throughput of the system.

There has been absent so far a working solution to the problem of to v transmission performance of the system operating on an unlicensed spectrum resource in the prior art.

SUMMARY

In view of the problem of low transmission performance of the system operating on an unlicensed spectrum resource in the prior art, the invention proposes a data transmission method and apparatus, which can adjust data transmission of an HARQ process flexibly so as to avoid retransmission on a carrier with serious interference to thereby improve the transmission performance.

In order to attain the object above, according to an aspect of the invention, there is provided a data transmission method, the method including:

receiving a PDCCH including indication field which can indicate at least different HARQ processes, the number of which is the sum of the maximum HARQ process numbers of a plurality of carriers, wherein data in the same HARQ process are initially transmitted and retransmitted on different carriers; and receiving data scheduled by the PDCCH, according to the PDCCH.

In a first scheme:

the plurality of carriers include FDD carriers and/or TDD carriers, and the indication field includes $\lceil \log_2 A \rceil$ bits of information, wherein A is determined in one of:

$$A = \sum_{i=0}^{N-1} X_i, A = N \times \max_{0 \le i \le N-1}(X_i), A = N \times X_{max}^{FDD}, A = N \times X_{max}^{TDD},$$

$$A = N \times X_{max}, A = N_{max} \times \max_{0 \le i \le N-1}(X_i), A = N_{max} \times X_{max}^{FDD},$$

$$A = N_{max} \times X_{max}^{TDD}, \text{ and } A = N_{max} \times X_{max};$$

wherein i represents a carrier index, $X_i$ represents the maximum HARQ process number of a carrier indexed i, N represents the number of configured or activated carriers, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

Moreover the plurality of carriers include only FDD carriers, each of which has the same maximum HARQ process number, and the indication field includes $\lceil \log_2 A \rceil$ bits of information, wherein A is determined in one of:

A=N×X, and A=$N_{max}$×X; wherein N represents the number of configured or activated carriers, X represents the maximum HARQ process number of each FDD carrier, and $N_{max}$ represents a predetermined maximum number of configured or activated carriers.

Moreover the carriers include FDD carriers and/or TDD carriers, and the indication field includes $\lceil \log_2 A \rceil$ bits of information, wherein A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

-continued $$A = N_1 \times X_{max}^{FDD} + N_2 \times X_{max}^{TDD}, A = \sum_{i \in A1} X_i^{FDD} + N_2 \times X_{max}, \text{ and}$$

$$A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

Moreover the plurality of carriers include FDD carriers and/or TDD carriers, and if the maximum HARQ process number of each of the FDD carriers is X, then the indication field includes $\lceil \log_2 A \rceil$ bits of information, wherein A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{TDD}$ represents the maximum one among the maximum HARQ process numbers of the respective TDD carriers, and $X_{max}$ represents the maximum one among the maximum HARQ process numbers of the respective FDD and TDD carriers; and moreover the indication field can alternatively includes a predetermined fixed number of bits of information, e.g., 7 bits of information; or if all the carriers are FDD carriers, then the indication field includes 6 bits of information; or if all the carriers are TDD carriers or both FDD and TDD carriers, then the indication field includes 7 bits of information.

In a second scheme:

in an approach A, the indication field includes an HARQ process number field, and a carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field.

Moreover optionally the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on a carrier scheduled by the PDCCH, and the HARQ process/HARQ process index indicated by the HARQ number indication field corresponds to an HARQ process/HARQ process index on a predetermined carrier; or if the PDCCH uses cross-carrier scheduling, then two different bit states of the 1 bit of information indicate respectively that: the HARQ process/HARQ process index indicated by the HARQ process number field corresponds to a HARQ process/HARQ process index on a carrier scheduled by the PDCCH, and the HARQ process/HARQ process index indicated by the HARQ number indication field corresponds to an HARQ process/HARQ process index on a carrier on which the PDCCH is transmitted.

Moreover receiving the data scheduled by the PDCCH, according to the PDCCH includes:

receiving the data scheduled by the PDCCH, on the carrier scheduled by the PDCCH.

In an approach B, the indication field includes an HARQ process number field, and a carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process (i.e., data corresponding to the HARQ process) are transmitted.

Where optionally the carrier indication field corresponding to the HARQ process number field includes 1 bit of information, and two different bit states of the 1 bit of information indicates respectively that: the data in the HARQ process indicated by the HARQ process number field are transmitted on a carrier scheduled by the PDCCH, and the data in the HARQ process indicated by the HARQ process number field are transmitted on a predetermined carrier; or if the PDCCH uses cross-carrier scheduling, then two different bit states of the 1 bit of information indicate respectively that: the data in the HARQ process indicated by the HARQ process number field are transmitted on a carrier scheduled by the PDCCH, and the data in the HARQ process indicated by the HARQ process number field are transmitted on a carrier on which the PDCCH is transmitted.

Moreover receiving the data scheduled by the PDCCH, according to the PDCCH includes:

receiving the data scheduled by the PDCCH, on the carrier indicated by the carrier indication field corresponding to the HARQ process number field.

Optionally for the approach A and the approach B, the carrier indication field corresponding to the HARQ process number field includes 3 bits of information.

Optionally for the approach A and the approach B, the carrier indication field corresponding to the HARQ process number field includes at least $\lceil \log_2 N' \rceil$ bits of information indicating at least N' carriers, wherein N' represents the number N of configured or activated carriers or a predetermined maximum number $N_{max}$ configured or activated carriers.

Moreover for the approach A and the approach B, the HARQ process number field indicates $X_{max}$ or $X_{max}^{FDD}$ or $X_{max}^{TDD}$ different HARQ processes, wherein $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

According to another aspect of the invention, there is further provided a data transmission method.

The method includes: sending a PDCCH including indication field which can indicate at least different HARQ processes, the number of which is the sum of the maximum HARQ process numbers of a plurality of carriers, wherein data in the same HARQ process are initially transmitted and retransmitted on different carriers; and sending data scheduled by the PDCCH.

In a first scheme:

the plurality of carriers include FDD carriers and/or TDD carriers, and the indication field includes $\lceil \log_2 A \rceil$ bits of information, wherein A is determined in one of:

$$A = \sum_{i=0}^{N-1} X_i, A = N \times \max_{0 \le i \le N-1}(X_i), A = N \times X_{max}^{FDD}, A = N \times X_{max}^{TDD},$$

$$A = N \times X_{max}, A = N_{max} \max_{0 \le i \le N-1}(X_i), A = N_{max} \times X_{max}^{FDD},$$

$$A = N_{max} \times X_{max}^{TDD}, \text{ and } A = N_{max} \times X_{max};$$

wherein i represents a carrier index, $X_i$ represents the maximum HARQ process number of a carrier indexed i, N represents the number of configured or activated carriers, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers; or moreover the plurality of carriers include only FDD carriers, each of which has the same maximum HARQ process number, and the indication field includes $\lceil \log_2 A \rceil$ bits of information, wherein A is determined in one of: $A = N \times X$, and $A = N_{max} \times X$; wherein N represents the number of configured or activated carriers, X represents the maximum HARQ process number of each FDD carrier, and $N_{max}$ represents a predetermined maximum number of configured or activated carriers; or moreover the plurality of carriers include FDD carriers and/or TDD carriers, and the indication field includes $\lceil \log_2 A \rceil$ bits of information, wherein A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

-continued
$$A = N_1 \times X_{max}^{FDD} + N_2 \times X_{max}^{TDD}, A = \sum_{i \in A1} X_i^{FDD} + N_2 \times X_{max}, \text{ and}$$
$$A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers; or moreover the plurality of carriers include FDD carriers and/or TDD carriers, and if the maximum HARQ process number of each of the FDD carriers is X, then the indication field includes $\lceil \log_2 A \rceil$ bits of information, wherein A is determined in one of:

$$A = N_1 \times X + \sum_{j \in A2} X_j^{TDD}, A_1 = N_1 \times X + N_2 \times \max_{j \in A2}(X_j^{TDD}),$$
$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{TDD}$ represents the maximum one among the maximum HARQ process numbers of the respective TDD carriers, and $X_{max}$ represents the maximum one among the maximum HARQ process numbers of the respective FDD and TDD carriers; or moreover the indication field can alternatively includes a predetermined fixed number of bits of information, e.g., 7 bits of information; or if all the carriers are FDD carriers, then the indication field includes 6 bits of information; or if all the carriers are TDD carriers or both FDD and TDD carriers, then the indication field includes 7 bits of information.

In a second scheme:

in an approach A, the indication field includes an HARQ process number field, and a carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field.

Optionally the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on a carrier scheduled by the PDCCH, and the HARQ process/HARQ process index indicated by the HARQ number indication field corresponds to an HARQ process/HARQ process index on a predetermined carrier; or if the PDCCH uses cross-carrier scheduling, then two different bit states of the 1 bit of information indicate respectively that: the HARQ process/HARQ process index indicated by the HARQ process number field corresponds to a HARQ process/HARQ process index on a carrier scheduled by the PDCCH, and the HARQ process/HARQ process index indicated by the HARQ number indication field corresponds to an HARQ process/HARQ process index on a carrier on which the PDCCH is transmitted.

Moreover sending the data scheduled by the PDCCH includes:

sending the data scheduled by the PDCCH, on the carrier scheduled by the PDCCH.

In an approach B, the indication field includes an HARQ process number field, and a carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process are transmitted.

Optionally the carrier indication field corresponding to the HARQ process number field includes 1 bit of information, and two different bit states of the 1 bit of information indicates respectively that: the data in the HARQ process indicated by the HARQ process number field are transmitted on a carrier scheduled by the PDCCH, and the data in the HARQ process indicated by the HARQ process number field are transmitted on a predetermined carrier; or if the PDCCH uses cross-carrier scheduling, then two different hit states of the 1 bit of information indicate respectively that: the data in the HARQ process indicated by the HARQ process number field are transmitted on a carrier scheduled by the PDCCH, and the data in the HARQ process indicated by the HARQ process number field are transmitted on a carrier on which the PDCCH is transmitted.

Moreover sending the data scheduled by the PDCCH includes:

sending the data scheduled by the PDCCH, on the carrier indicated by the carrier indication field corresponding to the HARQ process number field.

Optionally for the approach A and the approach B, the carrier indication field corresponding to the HARQ process number field includes 3 bits of information.

Optionally for the approach A and the approach B, the carrier indication field corresponding to the HARQ process number field includes at least $\lceil \log_2 N' \rceil$ bits of information indicating at least N' carriers, wherein N' represents the number N of configured or activated carriers or a predetermined maximum number $N_{max}$ of configured or activated carriers.

Moreover for the approach A and the approach B, the HARQ process number field indicates $X_{max}$ or $X_{max}^{FDD}$ $X_{max}^{TDD}$ different HARQ processes, wherein $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

According to still another aspect, there is provided a data transmission apparatus.

The apparatus includes: a first receiving module configured to receive a PDCCH including indication field which can indicate at least different HARQ processes, the number of which is the sum of the maximum HARQ process numbers of a plurality of carriers, wherein data in the same HARQ process are initially transmitted and retransmitted on different carriers; and a second receiving module configured to receive a data scheduled by the PDCCH, according to the PDCCH.

In a first scheme:

The plurality of carriers include FDD carriers and or TDD carriers, and the indication field includes $\lceil \log_2 A \rceil$ bits of information, wherein A is determined in one of:

$$A = \sum_{i=0}^{N-1} X_i, A = N \times \max_{0 \le i \le N-1}(X_i), A = N \times F_{max}^{FDD}, A = N \times X_{max}^{TDD},$$

$$A = N \times X_{max}, A = N_{max} \times \max_{0 \le i \le N-1}(X_i), A = N_{max} \times X_{max}^{FDD},$$

$$A = N_{max} \times X_{max}^{TDD}, \text{ and } A = N_{max} \times X_{max};$$

wherein i represents a carrier index, $X_i$ represents the maximum HARQ process number of a carrier indexed i, N represents the number of configured or activated carriers. $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ the maximum one among the maximum HARQ process numbers of the respective FDD and TDD carriers, and $N_{max}$ represents a predetermined maximum number of configured or activated carriers; or moreover the plurality of carriers include only FDD carriers, each of which has the same maximum HARQ process number, and the indication field includes $\lceil \log_2 A \rceil$ bits of information, wherein A is determined in one of: $A=N \times X$; and $A=N_{max} \times X$; wherein N represents the number of configured or activated carriers, X represents the maximum HARQ process number of each FDD carrier, and $N_{max}$ represents a predetermined maximum number of configured or activated carriers; or moreover the plurality of carriers include FDD carriers and/or TDD carriers, and the indication field includes $\lceil \log_2 A \rceil$ bits of information, wherein A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}), A = \sum_{i \in A1} X_i^{FDD} + N_2 \times X_{max}^{TDD},$$

$$A = N_1 \times X_{max}^{TDD} + \sum_{j \in A2} X_j^{TDD}, A = N_1 \times X_{max}^{FDD} + N_2 \times X_{max}^{TDD},$$

-continued $$A = \sum_{i \in A1} X_i^{FDD} + N_2 \times X_{max}, \text{ and } A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ a predetermined maximum number of configured or activated carriers; or moreover the plurality of carriers include FDD carriers and/or TDD carriers, and if the maximum HARQ process number of each of the FDD carriers is X, then the indication field includes $\lceil \log_2 A \rceil$ bits of information, wherein A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{TDD}$ represents the maximum one among the maximum HARQ process numbers of the respective TDD carriers, and $X_{max}$ represents the maximum one among the maximum HARQ process numbers of the respective FDD and TDD carriers; or moreover the indication field can alternatively includes a predetermined fixed number of bits of information, e.g., 7 bits of information; or if all the carriers are FDD carriers, then the indication field includes 6 bits of information; or if all the carriers are TDD carriers or both FDD and TDD carriers, then the indication field includes 7 bits of information.

In a second scheme:

The indication field in the PDCCH indicates the different HARQ processes, the number of which is the sum of the maximum HARQ process numbers of the plurality carriers, in one of:

approach A: the indication field includes an HARQ process number field, and a carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index by the HARQ process number field; and the second receiving module is configured to receive the data scheduled by the PDCCH, on a carrier scheduled by the PDCCH; and approach B: the indication field includes an HARQ process number field, and a carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process are transmitted; and the second receiving module is configured to receive the data scheduled by the PDCCH, on the carrier indicated by the carrier indication field corresponding to the HARQ process number field;

for the approach A, the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ process index on a predetermined carrier; or if the PDCCH uses cross-carrier scheduling, then two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ process index on a carrier on which the PDCCH is transmitted; or the carrier indication field corresponding to the HARQ process number field includes at least $\lceil \log_2 N' \rceil$ bits of information indicating at least N' carriers, wherein N' represents the number N of configured or activated carriers or a predetermined maximum number $N_{max}$ of configured or activated carriers; or the carrier indication field corresponding to the HARQ process number field includes 3 bits of information.

For the approach B, the carrier indication field corresponding to the HARQ process number field includes 1 bit of information, and two different bit states of the 1 bit of information indicates respectively that: the data in the HARQ process indicated by the HARQ process number field are transmitted on the carrier scheduled by the PDCCH, and the data in the HARQ process indicated by the HARQ process number field are transmitted on a predetermined carrier; or if the PDCCH uses cross-carrier scheduling, then two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted; or the carrier indication field corresponding to the HARQ process number field includes at least $\lceil \log_2 N' \rceil$ bits of information indicating at least N' carriers, wherein represents the number N of configured or activated carriers or a predetermined maximum number $N_{max}$ of configured or activated carriers; or the carrier indication field corresponding to the HARQ process number field includes 3 bits of information.

For the approach A and the approach B, the HARQ process number field indicates $X_{max}$ or $X_{max}^{FDD}$ of $X_{max}^{TDD}$ different HARQ processes, wherein $X_{max}^{FDD}$ represents the maximum one among the maximum HARQ process numbers of the respective FDD carriers, represents the maximum one among the maximum HARQ process numbers of the respective TDD carriers, and $X_{max}$ represents the maximum one among the maximum HARQ process numbers of the respective FDD and TDD carriers.

According to a further aspect of the invention, there is provided a data transmission apparatus.

The apparatus includes: a first sending module configured to send a PDCCH including indication field which can indicate at least different HARQ processes, the number of which is the sum of the maximum HARQ process numbers of a plurality of carriers, wherein data in the same HARQ process are initially transmitted and retransmitted on different carriers; and a second sending module configured to send a data scheduled by the PDCCH.

In a first scheme:

The plurality of carriers include FDD carriers and or TDD carriers, and the indication field includes $\lceil \log_2 A \rceil$ bits of information, wherein A is determined in one of:

$$A = \sum_{i=0}^{N-1} X_i,\ A = N \times \max_{0 \le i \le N-1}(X_i),\ A = N \times X_{max}^{FDD},\ A = N \times X_{max}^{TDD},$$

$$A = N \times X_{max},\ A = N_{max} \times \max_{0 \le i \le N-1}(X_i),\ A = N_{max} \times X_{max}^{FDD},$$

$$A = N_{max} \times X_{max}^{TDD},\ \text{and}\ A = N_{max} \times X_{max};$$

wherein i represents a carrier index, X represents the maximum HARQ process number of a carrier indexed i, N represents the number of configured or activated carriers, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers; or moreover the plurality of carriers include only FDD carriers, each of which has the same maximum HARQ process number, and the indication field includes $\lceil \log_2 A \rceil$ bits of information, wherein A is determined in one of: $A = N \times X$, and $A = N_{max} \times X$; wherein N represents the number of configured or activated carriers, X represents the maximum HARQ process number of each FDD carrier, and $N_{max}$ represents a predetermined maximum number of configured or activated carriers; or moreover the plurality of carriers include FDD carriers and/or TDD carriers, and the indication field includes $\lceil \log_2 A \rceil$ bits of information, wherein A is determined in one of:

$$A = \sum_{i \in A1} X_i^{FDD} + \sum_{j \in A2} X_j^{TDD},\ A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

-continued $$A = N_1 \times \max_{i \in A1}(X_i^{FDD}) + N_2 \times \max_{j \in A2}(X_j^{TDD}), A = \sum_{i \in A1} X_i^{FDD} + N_2 \times X_{max}^{TDD},$$

$$A = N_1 \times X_{max}^{FDD} + \sum_{j \in A2} X_j^{TDD}, A = N_1 \times X_{max}^{FDD} + N_2 \times X_{max}^{TDD},$$

$$A = \sum_{i \in A1} X_i^{FDD} + N_2 \times X_{max}, \text{ and } A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers; or moreover the plurality of carriers include FDD carriers and/or TDD carriers, and if the maximum HARQ process number of each of the FDD carriers is X, then the indication field includes $\lceil \log_2 A \rceil$ bits of information, wherein A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier numbed j, $N_1$ represents the number of configured or activated FDD carriers, $N_2$ represents the number of configured or activated TDD carriers, $N_1$ and $N_2$ are integers more than or equal to 0, $X_{max}^{TDD}$ represents the maximum one among the maximum HARQ process numbers of the respective TDD carriers, and $X_{max}$ represents the maximum one among the maximum HARQ process numbers of the respective FDD and TDD carriers; or moreover the indication field can alternatively includes a predetermined fixed number of bits of information, e.g., 7 bits of information; or if all the carriers are FDD carriers, then the indication field includes 6 bits of information; or if all the carriers are TDD carriers or both FDD and TDD carriers, then the indication field includes 7 bits of information.

In a second scheme:

The indication field in the PPDCCH indicates the different HARQ processes, the number of which is the sum of the maximum HARQ process numbers of the plurality of carriers, in one of:

approach A: the indication field includes an HARQ process number field, and a carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index by the HARQ process number field; and the second sending module is configured to send the data scheduled by the PDCCH, on a carrier scheduled by the PDCCH; and approach B: the indication field includes an HARQ process number field, and a carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process are transmitted: and the second sending module is configured to send the data scheduled by the PDCCH, on the carrier indicated by the carrier indication field corresponding to the HARQ process number field;

for the approach A, the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ index number on a predetermined carrier; or if the PDCCH uses cross-carrier scheduling, then two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ process index on a carrier on which the PDCCH is transmitted; or the carrier indication field corresponding to the HARQ process number field includes at least $\lceil \log_2 N' \rceil$ bits of information indicating at least N' carriers, wherein N' represents the number N of configured or activated carriers or a predetermined maximum number $N_{max}$ of configured or activated carriers; or the carrier indication field corresponding to the HARQ process number field includes 3 bits of information.

Moreover for the approach B, optionally the carrier indication field corresponding to the HARQ process number field includes 1 bit of information, and two different bit states of the 1 bit of information indicates respectively that: the data in the HARQ process indicated by the HARQ process number field are transmitted on the carrier scheduled by the PDCCH, and the data in the HARQ process indicated by the HARQ process number field are transmitted on a predetermined carrier; or if the PDCCH uses cross-carrier scheduling, then two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted; or the carrier indication field corresponding to the HARQ process number field includes at least $\lceil \log_2 N' \rceil$ bits of information indicating at least N' carriers, wherein N' represents the number N of configured or activated carriers or a predetermined maximum number $N_{max}$ of configured or activated carriers; or the carrier indication field corresponding to the HARQ process number field includes 3 bits of information.

For the approach A and the approach B, the HARQ process number field indicates $X_{max}$ or $X_{max}^{FDD}$ or $X_{max}^{TDD}$ different HARQ processes, wherein $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

With the invention, the transmission carriers on which the data in the same process are initially transmitted and retransmitted can be adjusted flexibly so that if there is serious interference on some one or more carriers, then the data transmitted in the process will be switched to be transmitted on a carrier with low interference so as to improve the transmission performance of the system; and the technical solutions according to the invention can be applicable to a number of scenarios so as to improve the transmission performance. For example, the inventive solutions can improve the transmission performance of the LTE system on an unlicensed spectrum resource.

BRIEF DESCRIPTION OF THE DRAWINGS

In order to make the technical solutions according to the embodiments of the invention or in the prior art more apparent, the drawings to which reference is made in the description of the embodiments will be described below in brief, and apparently the drawings described below illustrate only some embodiments of the invention, and those ordinarily skilled in the art can further derive other drawings from these drawings without any inventive effort. In the drawings.

DETAILED DESCRIPTION OF THE EMBODIMENTS

Figure 1:
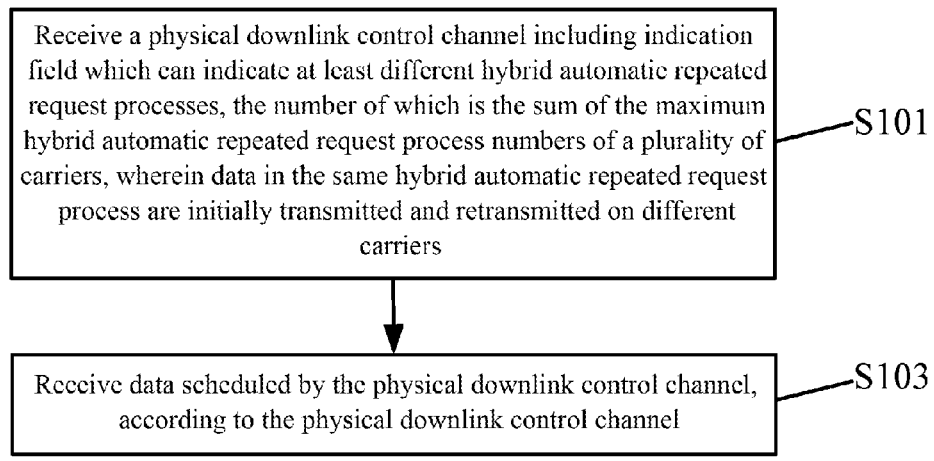
FIG. 1 is a flow chart of a data transmission method (at the UE side) according to an embodiment of the invention.

Exemplary embodiments of the invention will be described below in details with reference to the drawings. For the sake of clarity and conciseness, not all the features of an actual implementation will be described in this specification. However, it shall be appreciated that in the development of any such actual embodiment, numerous implementation-specific decisions shall be made to achieve the developers' specific goals, such as compliance with system-related and business-related constraints, which will vary from one implementation to another. Moreover, it shall be further appreciated that such a development effort might be complex and time-consuming, but will nevertheless be a routine undertaking for those of ordinary skill in the art having the benefit of this disclosure.

It shall be further noted here that only the apparatus structures and/or process steps closely relevant to the solution according to the invention are illustrated in the drawings, but other details less relevant to the invention have been omitted, so as not to obscure the invention due to the unnecessary details.

There is provided a data transmission method according to an embodiment of the invention, applicable to the UE side to receive data.

As illustrated in FIG. 1, the data transmission method according to the embodiment of the invention includes:

Step S101: receive a PDCCH, the PDCCH includes indication field which can indicate at least different HARQ processes, the number of which is the sum of the maximum HARQ process numbers of a plurality of carriers, where data in the same HARQ process are initially transmitted and retransmitted on different carriers; and Step S103: to receive data scheduled by the PDCCH, according to the PDCCH.

It shall be noted that the PDCCH as referred to in this context includes any one of a traditional PDCCH, an Enhanced Physical Downlink Control Channel (EPDCCH), a Relay Physical Downlink Control Channel (R-PDCCH), and other PDCCHs.

The indication field can indicate the HARQ processes, the number of which is the sum of the maximum HARQ process numbers of the plurality of carriers, in the following schemes as described below.

First Scheme

The indication field can indicate jointly the number of HARQ processes on the carriers.

In an embodiment, the plurality of carriers include FDD carriers and/or TDD carriers, and the indication field includes at least $\lceil \log_2 A \rceil$ bits of information, where A is determined in one of:

$$A = \sum_{i=0}^{N-1} X_i, A = N \times \max_{0 \le i \le N-1}(X_i), A = N \times X_{max}^{FDD}, A = N \times X_{max}^{TDD},$$

$$A = N \times X_{max}, A = N_{max} \times \max_{0 \le i \le N-1}(X_i), A = N_{max} \times X_{max}^{FDD},$$

$$A = N_{max} \times X_{max}^{TDD}, \text{ and } A = N_{max} \times X_{max};$$

Where i represents a carrier index, $X_i$ represents the maximum HARQ process number of a carrier indexed i, N represents the number of configured or activated carriers, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

In another embodiment, the plurality of carriers include only FDD carriers, each of which has the same maximum HARQ process number, and the indication field includes at least $\lceil \log_2 A \rceil$ bits of information, where A is determined in one of:

$A=N \times X$, and $A=N_{max} \times X$; where N represents the number of configured or activated carriers, X represents the maximum HARQ process number of each FDD carrier, and $N_{max}$ represents a predetermined maximum number of configured or activated carriers.

In another embodiment, the plurality of carriers include FDD carriers and/or TDD carriers, and the indication field includes at least $\lceil \log_2 A \rceil$ bits of information, where A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}), A = \sum_{i \in A1} X_i^{FDD} + N_2 \times X_{max}^{TDD},$$

$$A = N_1 \times X_{max}^{FDD} + \sum_{j \in A2} X_j^{TDD}, A = N_1 \times X_{max}^{FDD} + N_2 \times X_{max}^{TDD},$$

$$A = \sum_{i \in A1} X_i^{FDD} + N_2 \times X_{max}, \text{ and } A = N_1 \times X_{max} + \sum_{j \in A2} X_j^{TDD};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

In another embodiment, the plurality of carriers include FDD carriers and/or TDD carriers, and if the maximum HARQ process number of each of the FDD carriers is X, then the indication field includes at least $\lceil \log_2 A \rceil$ bits of information, where A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j. $N_1$ represents the number of configured or activated FDD carriers, $N_2$ represents the number of configured or activated TDD carriers, $N_1$ and $N_2$ are integers more than or equal to 0, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

In another embodiment, the number of bits of information in the indication field to indicate the HARQ process can be $\lceil \log_2 A \rceil = 7$; or if all the carriers are FDD carriers, then $\lceil \log_2 A \rceil = 6$; or if all the carriers are TDD carriers or both FDD and TDD carriers, then $\lceil \log_2 A \rceil = 7$; or the number of bits of information in the indication field to indicate the HARQ process can alternatively be another value in another embodiment which is not listed here.

Second Scheme

The second scheme is different from the first scheme in that a carrier indication field corresponding to a HARQ process (an HARQ process number field) is added, where the HARQ process can be indicated in the second scheme particularly including the following approaches A and B.

Approach A:

The indication field includes an HARQ process number field, and a carrier indication field corresponding to the HARQ process number field, where the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field.

In an embodiment, the carrier indication field corresponding to the HARQ process number field includes 1 bit of information, and two different bit states of the 1 bit of information indicate respectively that: the HARQ process/HARQ process index indicated by the HARQ process number field is a HARQ process/HARQ process index on a carrier scheduled by the PDCCH, and the HARQ process/HARQ process index indicated by the HARQ number indication field is an HARQ process/HARQ process index on a predetermined carrier; or If the PDCCH uses cross-carrier scheduling, then the carrier indication field corresponding to the HARQ process number field includes 1 bit of information, and two different bit states of the 1 bit of information indicate respectively that: the HARQ process/HARQ process index indicated by the HARQ process number field is a HARQ process/HARQ process index on a carrier scheduled by the PDCCH, and the HARQ process/HARQ process index indicated by the HARQ number indication field is an HARQ process/HARQ process index on a carrier on which the PDCCH is transmitted.

Moreover the data scheduled by the PDCCH are received according to the PDCCH by receiving the data scheduled by the PDCCH, on the carrier scheduled by the PDCCH.

Approach B:

The indication field includes an HARQ process number field, and a carrier indication field corresponding to the HARQ process number field, where the HARQ process number field indicates an HARQ process/HARQ process index on a carrier scheduled by the PDCCH, and the carrier indication field corresponding to the HARQ process number field indicates a carrier on which data in the HARQ process (i.e., data corresponding to the HARQ process) are transmitted.

In an embodiment, the carrier indication field corresponding to the HARQ process number field includes 1 bit of information, and two different hit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a predetermined carrier; or If the PDCCH uses cross-carrier scheduling, then the carrier indication field corresponding to the HARQ process number field includes 1 bit of information, and two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted.

Moreover the data scheduled by the PDCCH are received according to the PDCCH by receiving the data scheduled by the PDCCH, on the carrier indicated by the carrier indication field corresponding to the HARQ process number field.

Moreover for the approach A and the approach B, the carrier indication field corresponding to the HARQ process number field includes at least $\lceil \log_2 N' \rceil$ bits of information indicating at least N' carriers, where N' represents the number N of configured or activated carriers or a predetermined maximum number $N_{max}$ of configured or activated carriers; or for the approach A and the approach B, the carrier indication field corresponding to the HARQ process number field can include 3 bits of information.

Moreover for the approach A and the approach B, the HARQ process number field indicates $X_{max}$ or $X_{max}^{FDD}$ or $X_{max}^{TDD}$ different HARQ processes/HARQ process indices, where $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

There is further provided a data transmission method according to an embodiment of the invention, applicable to the network side to send data.

Figure 2:
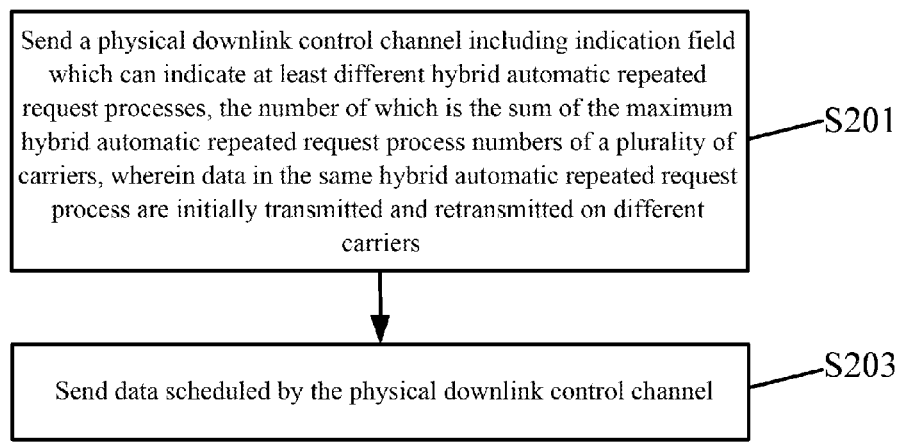
FIG. 2 is a flow chart of a data transmission method (at the eNB side) according to an embodiment of the invention.

As illustrated in FIG. 2, the data transmission method according to the embodiment of the invention includes:

Step S201: send a PDCCH including indication field which can indicate at least different HARQ processes, the number of which is the sum of the maximum HARQ process numbers of a plurality of carriers, where data in the same HARQ process are initially transmitted and retransmitted on different carriers; and Step S203: send data scheduled by the PDCCH.

Alike the eNB can indicate the HARQ processes in the first scheme and the second scheme above at the network side.

First Scheme

In an embodiment, the plurality of carriers include FDD carriers and/or TDD carriers, and the indication field includes at least $\lceil \log_2 A \rceil$ bits of information, where A is determined $$A = \sum_{i=0}^{N-1} X_i, A = N \times \max_{0 \leq i \leq N-1}(X_i), A = N \times X_{max}^{FDD}, A = N \times X_{max}^{TDD},$$

$$A = N \times X_{max}, A = N_{max} \times \max_{0 \leq i \leq N-1}(X_i), A = N_{max} \times X_{max}^{FDD},$$

$$A = N_{max} \times X_{max}^{TDD}, \text{ and } A = N_{max} \times X_{max};$$

Where i represents a carrier index, $X_i$ represents the maximum HARQ process number of a carrier indexed i, N represents the number of configured or activated carriers, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

In another embodiment, the plurality of carriers include only FDD carriers, each of which has the same maximum HARQ process number, and the indication field includes at least $\lceil \log_2 A \rceil$ bits of information, where A is determined in one of: $A = N \times X$ and $A = N_{max} \times X$; where N represents the number of configured or activated carriers, X represents the maximum HARQ process number of each FDD carrier, and $N_{max}$ represents a predetermined maximum number of configured or activated carriers.

In another embodiment, the plurality of carriers include FDD carriers and/or TDD carriers, and the indication field includes at least $\lceil \log_2 A \rceil$ bits of information, where A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}), A = \sum_{i \in A1} X_i^{FDD} + N_2 \times X_{max}^{TDD},$$

$$A = N_1 \times X_{max}^{FDD} + \sum_{j \in A2} X_j^{TDD}, A = N_1 \times X_{max}^{FDD} + N_2 \times X_{max}^{TDD},$$

$$A = \sum_{i \in A1} X_i^{FDD} + N_2 \times X_{max}, \text{ and } A = N_1 \times X_{max} + \sum_{j \in A2} X_j^{TDD};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j. $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

In another embodiment, the plurality of carriers include FDD carriers and/or TDD carriers, and if the maximum HARQ process number of each of the FDD carriers is X, then the indication field includes at least $\lceil \log_2 A \rceil$ bits of information, where A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

In an embodiment of the first scheme above, the number of bits of information in the indication field to indicate an HARQ process can be $\lceil \log_2 A \rceil = 7$; or if all the carriers are FDD carriers, then $\lceil \log_2 A \rceil = 6$; or if all the carriers are TDD carriers or both FDD and TDD carriers, then $\lceil \log_2 A \rceil = 7$; or the number of bits of information in the indication field to indicate an HARQ process can alternatively be another value in another embodiment which is not listed here.

Second Scheme

Approach A:

The indication field includes an HARQ process number field, and a carrier indication field corresponding to the HARQ process number field, where the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field.

In an embodiment, the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on a carrier scheduled by the PDCCH and the HARQ process/HARQ process index indicated by the HARQ number indication field corresponds to an HARQ process/HARQ process index on a predetermined carrier; or If the PDCCH uses cross-carrier scheduling, then the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on a carrier scheduled by the PDCCH, and the HARQ process/HARQ process index indicated by the HARQ number indication field corresponds to an HARQ process/HARQ process index on a carrier on which the PDCCH is transmitted.

Moreover the data scheduled by the PDCCH are received according to the PDCCH by receiving the data scheduled by the PDCCH, on the carrier scheduled by the PDCCH.

Approach B:

The indication field includes an HARQ process number field, and a carrier indication field corresponding to the HARQ process number field, where the HARQ process number field indicates an HARQ process/HARQ process index on a carrier scheduled by the PDCCH, and the carrier indication field corresponding to the HARQ process number field indicates a carrier on which data in the HARQ process (i.e., data corresponding to the HARQ process) are transmitted.

In an embodiment, the carrier indication field corresponding to the HARQ process number field includes 1 bit of information, and two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a predetermined carrier; or If the PDCCH uses cross-carrier scheduling, then the carrier indication field corresponding to the HARQ process number field includes 1 bit of information, and two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted.

Moreover the data scheduled by the PDCCH are received according to the PDCCH by receiving the data scheduled by the PDCCH, on the carrier indicated by the carrier indication field corresponding to the HARQ process number field.

In reality, for the approach A and the approach B, the carrier indication field corresponding to the HARQ process number field includes at least $\lceil \log_2 N' \rceil$ bits of information indicating at least N' carriers, where N' represents the number N of configured or activated carriers, or a predetermined maximum number $N_{max}$ of configured or activated carriers; or for the approach A and the approach B, the carrier indication field corresponding to the HARQ process number field can include 3 bits of information.

Moreover for the approach A and the approach B, the HARQ process number field indicates $X_{max}$ or $X_{max}^{FDD}$ or $X_{max}^{TDD}$ different HARQ processes/HARQ process indices, where $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

In a real application, the processing flow at the UE side is as follows:

The UE receives a PDCCH, where a DCI format for the PDCCH includes at least an indication field which can indicate at least $X_a + X_b$ different HARQ processes, and initial transmission and retransmission carriers of data corresponding to the same HARQ process number are different, where $X_a$ represents the maximum HARQ process number on a carrier with a carrier index a, and $X_b$ represents the maximum HARQ process number on a carrier with a carrier index b. In reality, the number of HARQ processes indicated by the indication field will not be limited to the carriers with the carrier indices a and b, but the indication field can indicate HARQ processes, the number of which is the sum of the maximum HARQ process numbers of all or a part of N carriers activated or aggregated for the UE, and N≥2; and The UE receives data scheduled by the PDCCH.

The processing flow at the eNB side is as follows:

The eNB sends a PDCCH to the UE, where a DCI format for the PDCCH includes at least an indication field which can indicate at least $X_a+X_b$ different HARQ processes, and initial transmission and retransmission carriers of data corresponding to the same HARQ process number are different, where $X_a$ represents the maximum HARQ process number on a carrier with a carrier index a, and $X_b$ represents the maximum HARQ process number on a carrier with a carrier index b. In reality, the number of HARQ processes indicated by the indication field will not be limited to the carriers with the carrier indices a and b, but the indication field can indicate HARQ processes, the number of which is the sum of the maximum HARQ process numbers of all or a part of N carriers activated or aggregated for the UE, and N≥2; and The eNB sends data scheduled by the PDCCH to the UE.

The HARQ processes can be indicated by the indication field particularly as follows:

First Scheme (corresponding to the first scheme above)

The indication field is an HARQ process number field which can indicate at least $$\sum_{i=0}^{N-1} X_i$$

different HARQ process indices, where $X_i$ represents the maximum HARQ process number on a carrier with a carrier index i, and particularly includes the following information:

No matter whether the N carriers include only the same type of carriers (that is, the indication field will be applicable to the carriers including only FDD carriers or only TDD carriers or both FDD and TDD carriers), the HARQ process number field can indicate $$A = \sum_{i=0}^{N-1} X_i \text{ or } A = N \times \max_{0 \le i \le N-1}(X_i) \text{ or } A = N \times X_{max}^{FDD} \text{ or}$$

$$A = N \times X_{max}^{TDD} \text{ or } A = N \times X_{max} \text{ or } A = N_{max} \times \max_{0 \le i \le N-1}(X_i) \text{ or}$$

$$A = N_{max} \times X_{max}^{FDD} \text{ or } A = N_{max} \times X_{max}^{TDD} \text{ or } A = N_{max} \times X_{max}$$

different HARQ process numbers, and include at least $\lceil \log_2 A \rceil$ bits of information, where N represents the number of carriers aggregated or activated for the UE, $X_i$ represents the maximum HARQ process number on the carrier (which may be an FDD carrier or a TDD carrier) with the carrier index i, $N_{max}$ represents the maximum number of carriers which can be aggregated or activated for the UE, $X_{max}^{FDD}$ represents the maximum one among the defined maximum HARQ process numbers of the respective FDD carriers, $X_{max}^{TDD}$ represents the maximum one among the defined maximum HARQ process numbers of the respective TDD carriers, and $X_{max}$ represents the maximum one among the defined maximum HARQ process numbers of the respective FDD and TDD carriers;

If the N carriers include only FDD carriers, the HARQ process number field can further indicate at least A=N×X or A=$N_{max}$×X different HARQ process indices, and include at least $\lceil \log_2 A \rceil$ bits of information, where all the maximum process numbers of the respective FDD carriers are the same as X;

If the N carriers include $N_1$ FDD and $N_2$ TDD carriers, and $N_1+N_2=N$, the HARQ process number field can further indicate at least $$A = \sum_{i \in A1} X_i^{FDD} + \sum_{j \in A2} X_j^{TDD} \text{ or } A = \sum_{i \in A1} X_i^{FDD} + N_2 \times \max_{j \in A2}(X_j^{TDD}) \text{ or}$$

$$A = N_1 \times \max_{i \in A1}(X_i^{FDD}) + \sum_{j \in A2} X_j^{TDD} \text{ or}$$

$$A = N_1 \times \max_{i \in A1}(X_i^{FDD}) + N_2 \times \max_{j \in A2}(X_j^{TDD}) \text{ or}$$

$$A = \sum_{i \in A1} X_i^{FDD} + N_2 \times X_{max}^{TDD} \text{ or } A = N_1 \times X_{max}^{FDD} + \sum_{j \in A2} X_j^{TDD} \text{ or}$$

$$A = N_1 \times X_{max}^{FDD} + N_2 \times X_{max}^{TDD} \text{ or } A = \sum_{i \in A1} X_i^{FDD} + N_2 \times X_{max} \text{ or}$$

$$A = N_1 \times X_{max} + \sum_{j \in A2} X_j^{TDD}$$

different HARQ process indices, and include at least $\lceil \log_2 A \rceil$ bits of information, where $N_1$ or $N_2$ can be 0, $A_1$ represents a set of carrier indices of the $N_1$ FDD carriers, A2 represents a set of carrier indices of the $N_2$ TDD carriers, $X_i^{FDD}$ represents the maximum HARQ process number of an FDD carrier indexed i, and $X_j^{TDD}$ represents the maximum HARQ process number of a TDD carrier indexed j;

Preferably if the N carriers include $N_1$ FDD and $N_2$ TDD carriers, and $N_1+N_2=N$, then if all the maximum process numbers of the respective FDD carriers are the same as X, that is, $X_i^{FDD}$ corresponding to the FDD carriers is $X_i^{FDD}=X_{max}^{FDD}=X$, and at this time the HARQ process number field can indicate at $$A = N_1 \times X + \sum_{j \in A2} X_j^{TDD} \text{ or } A = N_1 \times X + N_2 \times \max_{j \in A2}(X_j^{TDD}) \text{ or}$$

$$A = N_1 \times X + N_2 \times X_{max}^{TDD} \text{ or } A = N_1 \times X + N_2 \times X_{max}$$

different HARQ process indices, and include at least $\lceil \log_2 A \rceil$ bits of information;

In the case above, preferably $\lceil \log_2 A \rceil$=7 (with $N_{max}$=5 and $X_{max}$=15) or if all the N carriers are FDD carriers, then $\lceil \log_2 A \rceil$=6 (with $N_{max}$=5 and $X_{max}$=8), and if all the N carriers are TDD carriers or include FDD and TDD carriers, then $\lceil \log_2 A \rceil$=7;

In the case above, preferably if $\lceil \log_2 A \rceil$≤3, then an HARQ process number field in an FDD DCI format defined in the original LTE Rel-8/10 system to carry a PDCCH will be reused as the HARQ process number field; and if $\lceil \log_2 A \rceil$>3, then the HARQ process number field in the FDD DCI format defined in the original LTE Rel-8/10 system to carry a PDCCH will be supplemented with (A−3) bits and used as the HARQ process number field; or If $\lceil \log_2 A \rceil$≤4, then an HARQ process number field in an FDD DCI format defined in the original LTE Rel-8/10 system to carry a PDCCH will be reused as the HARQ process number field; and if $\lceil \log_2 A \rceil$>4, then the HARQ process number field in the FDD DCI format defined in the original LTE Rel-8/10 system to carry a PDCCH will be supplemented with (A−4) bits and used as the HARQ process number field;

The UE receives the data scheduled by the PDCCH, on a carrier scheduled by the PDCCH (a carrier on which the PDCCH is transmitted may not be the same as the carrier on which the data are transmitted);

Preferably $2 \le N \le N_{max}$;

Preferably $X_{max}=15$; or if all the N carriers are FDD carriers, then $X_{max}=8$; and if all the N carriers are FDD carriers or include FDD and TDD carriers, then $X_{max}=15$; and Preferably $N_{max}=5$; $X_{max}^{FDD}=8$; and $X_{max}^{TDD}=15$.

It shall be noted that both the HARQ process index, and the carrier index in the embodiment above start with the index 0; and moreover the carrier index may alternatively start with the index 1, and the scheme above will be also applicable thereto, so a repeated description thereof will be omitted here.

An implementation of the first scheme will be described below in details with reference to particular instances.

First Embodiment

Carriers aggregated or activated for the UE are two FDD carriers, i.e., N=2, and the maximum HARQ process number of each carrier is 8, i.e., $X=X_{max}^{FDD}=8$. In order to retransmit data and change a carrier, particular operations are as follows:

In approach 1), an HARQ process number field can indicate at least A=N×X=16 or A=N×$X_{max}^{FDD}$=16 different process indices, and include at least $\lceil \log_2 A \rceil$=4 bits of information, where different binary combination states of the 4 bits of information represent 16 different process indices, which range from 0 to 15 corresponding to 16 different processes respectively, as depicted in Table 2;

In approach 2), if $X_{max}$=15, then an HARQ process number field can indicate at least A=N×$X_{max}$=30 different process indices, and include at least $\lceil \log_2 A \rceil$=5 bits of information, where different binary combination states of the 5 bits of information represent 32 different process indices, which range from 0 to 31 corresponding to 16 different processes respectively, as depicted in Table 3; and since only at most 30 processes need to be indicated in this embodiment, only the first 30 states in Table 3 can be defined, and the remaining states can be reserved; and since there are only 16 processes on two carriers in reality, only the first 16 states in Table 3 can be applied; and In approach 3), if $N_{max}$=5, then an HARQ process number field can indicate at least A=$N_{max}$×X=$N_{max}$×$X_{max}^{FDD}$=40 different process indices, and include at least $\lceil \log_2 A \rceil$=6 bits of information, where different binary combination states of the 6 bits of information represent 64 different process indices; and since only at most 40 processes need to be indicated in this embodiment, only 40 states can be defined to indicate 40 different process indices ranging from 0 to 39 corresponding to 40 different processes as depicted in Table 4, so that if $N_{max}$=5 carriers are aggregated for the UE, 40 HARQ processes of 5 carriers can be indicated; and since there are only 16 processes on two carriers in reality in this embodiment, only the first 16 states in Table 4 can be applied.

With the method above, for transmission of a Transport Block (TB), if an HARQ process index corresponding thereto is P, and the TB is initially transmitted on a carrier 0, then the eNB will set an HARQ process number field in a PDCCH scheduling the carrier 0 to indicate the process index P, and an NDI field in the PDCCH to indicate new data (initial transmission) to thereby schedule the TB to be initially transmitted, and the UE will receive the PDCCH on a carrier scheduling the carrier 0, determine from the HARQ process number field in the PDCCH that the TB scheduled by the PDCCH corresponds to the process P, and receive the initially transmitted TB corresponding to the process P on the carrier 0; and if the transmission carrier of the TB needs to be changed to retransmit the TB on a carrier 1, then the eNB can set an HARQ process number field in a PDCCH of the carrier 1 to indicate the process index P, and an NDI field in the PDCCH to indicate retransmitted data so as to schedule the TB to be retransmitted, and the UE can receive the PDCCH on a carrier scheduling the carrier 1, determine from the HARQ process number field in the PDCCH that the TB scheduled by the PDCCH corresponds to the process P, and receive the retransmitted TB corresponding to the process P on the carrier 1.

Table 2: Indicators in 4-bit HARQ process number field

TABLE 2

Indicators in 4-bit HARQ process number field

| Bit states in HARQ process number field | Indicated HARQ process indices |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100 | 12 |
| 1101 | 13 |
| 1110 | 14 |
| 1111 | 15 |

Table 3: Indicators in 5-bit HARQ process number field

TABLE 3

Indicators in 5-bit HARQ process number field

| Bit states in HARQ process number field | Indicated HARQ process indices |
|---|---|
| 00000 | 0 |
| 00001 | 1 |
| 00010 | 2 |
| 00011 | 3 |
| . . . | . . . |
| 11100 | 28 |
| 11101 | 29 |
| 11110 | 30 |
| 11111 | 31 |

Table 4: Indicators in 5-bit HARQ process number field

TABLE 4

Indicators in 5-bit HARQ process number field

| Bit states in HARQ process number field | Indicated HARQ process indices |
|---|---|
| 000000 | 0 |
| 000001 | 1 |
| 000010 | 2 |
| 000011 | 3 |
| . . . | . . . |
| 100100 | 36 |
| 100101 | 37 |
| 100110 | 38 |

TABLE 4-continued

Indicators in 5-bit HARQ process number field

| Bit states in HARQ process number field | Indicated HARQ process indices |
|---|---|
| 100111 | 39 |
| 101000 | Reserved |
| ... | ... |
| 111110 | Reserved |
| 111111 | Reserved |

Second Embodiment

Carriers aggregated or activated for the UE are two TDD carriers, where a TDD uplink/downlink configuration of a carrier 0 is the TDD uplink/downlink configuration 0, and the maximum HARQ process number thereof is 4, i.e., $X_0=4$, and a TDD uplink/downlink configuration of a carrier 1 is the TDD uplink/downlink configuration 6, and the maximum HARQ process number thereof is 6, i.e., $X_1=6$. In order to retransmit data and change a carrier, particular operations are as follows:

In approach 1), HARQ process number field can indicate at least $$A = \sum_{i=0}^{N-1} X_i = 10$$

different process indices, and include at least $\lceil \log_2 A \rceil = 4$ bits of information, and particular indicators are as depicted in Table 2; and since only at most 10 processes need to indicated in this embodiment, only the first 10 states in Table 2 can be defined, and the remaining states can be reserved:

In approach 2), an HARQ process number field can indicate at least $$A = N \times \max_{0 \le i \le N-1}(X_i) = 2*6 = 12$$

different process indices, and include at least $\lceil \log_2 A \rceil = 4$ bits of information, and particular indicators are as depicted in Table 2; and since only at most 12 processes need to indicated in this embodiment, only the first 12 states in Table 2 can be defined, and the remaining states can be reserved;

In approach 3), if $N_{max}=5$, then an HARQ process number field can indicate at least $$A = N_{max} \times \max_{0 \le i \le N-1}(X_i) = 5*6 = 30$$

different process indices, and include at least $\lceil \log_2 A \rceil = 5$ bits of information, and particular indicators are as depicted in Table 3; and since only at most 30 processes need to indicated in this embodiment, only the first 30 states in Table 3 can be defined, and the remaining states can be reserved;

In approach 4), if $N_{max}=5$, and $X_{max}=X_{max}^{TDD}=15$, then an HARQ process number field can indicate at least $A=N\times X_{max}^{TDD}=2*15=30$ or $A=N\times X_{max}=2*15=30$ different process indices, and include at least $\lceil \log_2 A \rceil = 5$ bits of information, and particular indicators are as depicted in Table 3; and since only at most 30 processes need to be indicated in this embodiment, only the first 30 states in Table 3 can be defined, and the remaining states can be reserved; and In approach 5), if $N_{max}=5$, and $X_{max}^{TDD}=15$, then an HARQ process number field can indicate at least $A=N_{max}\times X_{max}^{TDD}=5*15=75$ or $A=N_{max}\times X_{max}=5*15=75$ different process indices, and include at least $\lceil \log_2 A \rceil = 7$ bits of information, and there are 128 different binary combination states of the 7 bits of information; and since only at most 75 processes need to be indicated in this embodiment, 75 states can be defined to indicate 75 different process indices ranging from 0 to 74 corresponding to the 75 processes as depicted in Table 5, and the remaining states can be reserved.

With the method above, since there are only at most 10 processes in this embodiment, only the first 10 states in the corresponding table will be applied; and particular approaches of scheduling and transmitting a TB to be transmitted can be the same as the first embodiment, so a repeated description thereof will be omitted here.

TABLE 5

Indicators in 7-bit HARQ process number field

| Bit states in HARQ process number field | Indicated HARQ process indices |
|---|---|
| 0000000 | 0 |
| 0000001 | 1 |
| 0000010 | 2 |
| 0000011 | 3 |
| ... | ... |
| 1000111 | 71 |
| 1001000 | 72 |
| 1001001 | 73 |
| 1001010 | 74 |
| 1001011 | Reserved |
| ... | ... |
| 1111110 | Reserved |
| 1111111 | Reserved |

Third Embodiment

Carriers aggregated or activated for the UE are one FDD carrier (a carrier 0) and two TDD carriers (a carrier 1 and a carrier 2), i.e., $N=3$, $N_1=1$, and $N_2=2$, where the maximum HARQ process number of the carrier 0 is 8, i.e., $X_0=X_0^{FDD}=8$; a TDD uplink/downlink configuration of the carrier 1 is the TDD uplink/downlink configuration 2, and the maximum HARQ process number thereof is 10, i.e., $X_1=X_1^{TDD}=10$; and a TDD uplink/downlink configuration of the carrier 2 is the TDD uplink/downlink configuration 4, and the maximum HARQ process number thereof is 12, i.e., $X_2=X_2^{TDD}=12$. In order to retransmit data and change a carrier, particular operations are as follows:

In approach 1), an HARQ process number indicator can indicate at least $$A = \sum_{i=0}^{N-1} X_i = 30 \text{ or } A = N_i \times X + \sum_{j \in A2} X_j^{TDD} = 30$$

different HARQ process indices, and include at least $\lceil \log_2 A \rceil = 5$ bits of information, and particular indicators are as depicted in Table 3; and since only at most 30 processes need to be indicated in this embodiment, only the first 30 states in Table 3 can be defined, and the remaining states can be reserved;

In approach 2), an HARQ process number indicator can indicate at least $$A = N \times \max_{0 \le i \le N-1} (X_i) = 3*12 = 36$$

different HARQ process indices and include at least $\lceil \log_2 A \rceil = 6$ bits of information, and particular indicators are as depicted in Table 4; and since only at most 36 processes need to be indicated in this embodiment, only the first 36 states in Table 4 can be defined, and the remaining states can be reserved;

In approach 3), an HARQ process number indicator can indicate at least $$A = N_{max} \times \max_{0 \le i \le N-1} (X_i) = 5*12 = 60$$

different HARQ process indices, and include at least $\lceil \log_2 A \rceil = 6$ bits of information, and particular indicators are as depicted in Table 4; and since only at most 60 processes need to be indicated in this embodiment, only the first 60 states in Table 4 can be defined, and the remaining states can be reserved;

In approach 4), if $N_{max}=5$, and $X_{max}=X_{max}^{TDD}=15$, then an HARQ process number field can indicate at least $A=N \times X_{max}^{TDD} 3*15=45$ or $A=N \times X_{max}=3*15=45$ different process indices, and include at least $\lceil \log_2 A \rceil = 6$ bits of information, and particular indicators are as depicted in Table 4; and since only at most 60 processes need to be indicated in this embodiment, only the first 60 states in Table 4 can be defined, and the remaining states can be reserved;

In approach 5), if $N_{max}=5$, and $X_{max}=X_{max}^{TDD}=15$, then an HARQ process number field can indicate at least $A=N_{max} \times X_{max}^{TDD}=5*15=75$ or $A=N_{max} \times X_{max}=5*15=75$ different process indices, and include at least $\lceil \log_2 A \rceil = 7$ bits of information, where there are 128 different binary combination states of the 7 bits of information; and since at most 75 processes need to be indicated in this embodiment, 75 states can be defined to indicate 75 different process indices ranging from 0 to 74 corresponding to 75 different processes as depicted in Table 5, and the remaining states can be reserved;

In approach 6), an HARQ process number indicator can indicate at least $$A = N_1 \times X + N_2 \times \max_{j \in A2}(X_j^{TDD}) = 32$$

different HARQ process indices, and include at least $\lceil \log_2 A \rceil = 5$ bits of information, and particular indicators are as depicted in Table 3; and In approach 7), an HARQ process number field can indicate at least $A=N_1 \times X+N_2 \times X_{max}^{TDD}=38$ or $A=N_1 \times X+N_2 \times X_{max}=38$ different process indices, and include at least $\lceil \log_2 A \rceil = 6$ bits of information, and particular indicators are as depicted in Table 4; and since at most 38 processes need to be indicated in this embodiment, only the first 38 states in Table 4 can be defined, and the remaining states can be reserved.

With the method above, since there are only at most 36 processes of 3 carriers in this embodiment, only the first 36 states in the corresponding table will be applied; and particular approaches of scheduling and transmitting a TB to be transmitted can be the same as the first embodiment, so a repeated description thereof will be omitted here.

Second Scheme (corresponding to the second scheme):

The indication field includes an HARQ process number field, and a carrier indication field corresponding to the HARQ process number field:

Approach A: The HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field.

Approach B: The HARQ process number field indicates an HARQ process/HARQ process index on a carrier scheduled by the PDCCH, and the carrier indication field corresponding to the HARQ process number field indicates a carrier on which data in the HARQ process indicated by the HARQ process number field are transmitted.

Where for the approach A and the approach B with self-carrier scheduling and cross-carrier scheduling, the carrier indication field corresponding to the HARQ process number field can indicate at least N' different carriers, and include at least $\lceil \log_2 N' \rceil$ bits of information, where N'=N or $N_{max}$, and $N_{max}$ represents the maximum number of carriers which can be aggregated or activated for the UE;

Preferably the carrier indication field corresponding to the HARQ process number field includes 3 bits of information to indicate carrier numbers of the N' carriers.

Alternatively the carrier indication field corresponding to the HARQ process number field includes 1 bit of information:

For the approach A, two different bit states of the 1 bit of information indicate respectively that: the HARQ process/HARQ process index indicated by the HARQ process number field corresponds to a HARQ process/HARQ process index on a carrier scheduled by the PDCCH, and the HARQ process/HARQ process index indicated by the HARQ number indication field corresponds to an HARQ process/HARQ process index on a predetermined carrier; and for the approach B, two different bit states of the 1 bit of information indicates respectively that: the data in the HARQ process indicated by the HARQ process number field are transmitted on the carrier scheduled by the PDCCH, and the data in the HARQ process indicated by the HARQ process number field are transmitted on a predetermined carrier, where the indicators described here will apply to the PDCCH with either the self-carrier scheduling or cross-carrier scheduling;

If the PDCCH uses cross-carrier scheduling, then for the approach A, two different bit states of the 1 bit of information indicate respectively that: the HARQ process/HARQ process index indicated by the HARQ process number field corresponds to a HARQ process/HARQ process index on a carrier scheduled by the PDCCH, and the HARQ process/HARQ process index indicated by the HARQ number indication field corresponds to an HARQ process/HARQ process index on a carrier on which the PDCCH is transmitted; and for the approach B, two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted;

The HARQ process number field can indicate $X_{max}$ or $X_{max}^{FDD}$ or $X_{max}^{TDD}$ different HARQ processes, where $X_{max}^{FDD}$ represents the maximum one among the defined maximum HARQ process numbers of the respective FDD carriers, $X_{max}^{TDD}$ represents the maximum one among the defined maximum HARQ process numbers of the respective TDD carriers, and $X_{max}$ represents the maximum one among the defined maximum HARQ process numbers of the respective FDD and TDD carriers;

Preferably the HARQ process number field is an FDD/TDD DCI format defined in the original LTE Rel-8/10 system to carry a PDCCH;

For the approach A, the UE receives the data scheduled by the PDCCH, on the carrier scheduled by the PDCCH;

For the approach B, the UE receives the data scheduled by the PDCCH, on the carrier indicated by the carrier indication field corresponding to the HARQ process number field, in the PDCCH;

Preferably $2 \leq N \leq N_{max}$;
Preferably $2 \leq N' \leq N_{max}$;
Preferably $X_{max}=15$; or if all the N carriers are FDD carriers, then $X_{max}=8$; and if all the N carriers are TDD carriers or include FDD and TDD carriers, $X_{max}=15$;

Preferably $N_{max}=5$; $X_{max}^{FDD}=8$; and $X_{max}^{TDD}=16$;

It shall be noted that both the HARQ process index, and the carrier index in the embodiment above start with the index 0; and moreover the carrier index may alternatively start with the index 1, and the scheme above will be also applicable thereto, so a repeated description thereof will be omitted here.

Fourth Embodiment

Figure 3:
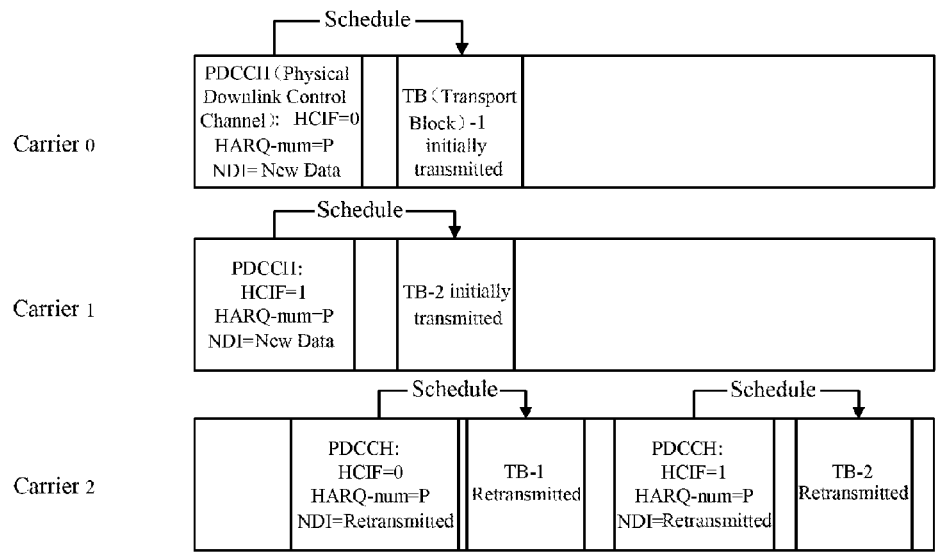
FIG. 3 to FIG. 6 are schematic diagrams of particular conditions of scheduling by a PDCCH in the data transmission method according to an embodiment of the invention.
Figure 4:
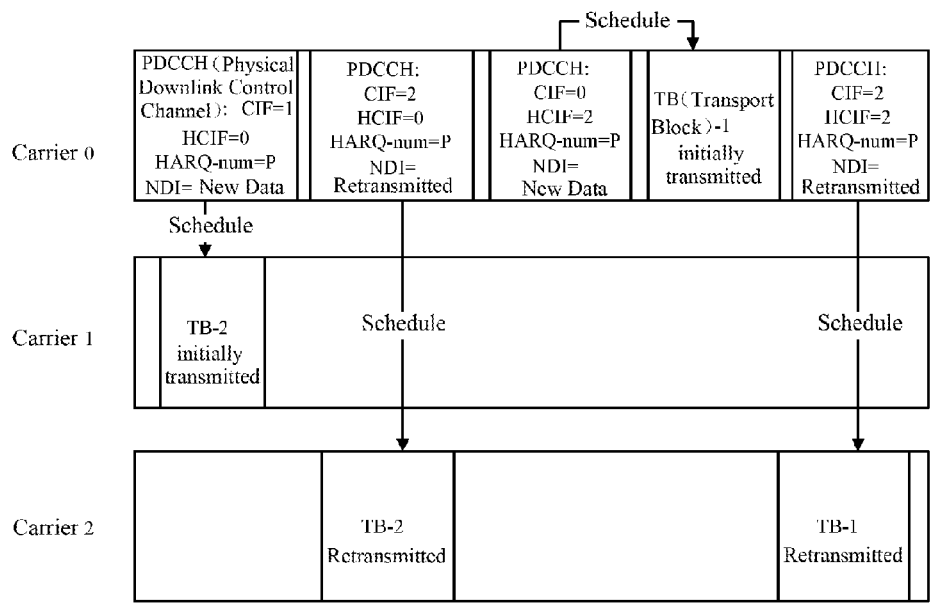

N=3 carriers are aggregated for the UE, and in a first scenario, all the 3 carriers can be FDD carriers; in a second scenario, all the 3 carriers are TDD carriers; and in a third scenario, a part of the carriers are FDD carriers, and a part of the carriers are TDD carriers, for example, a carrier 0 is an FDD carrier, and carriers 1 and 2 are TDD carriers, where all the maximum HARQ process numbers on the respective FDD carriers are 8, and the maximum HARQ process numbers on the respective TDD carriers may or may not be the same, dependent upon uplink/downlink configurations of the TDD carriers or a reference uplink/downlink configuration, for example, if the TDD uplink/downlink configuration is the TDD uplink/downlink configuration 0, then the maximum HARQ process number of the TDD carrier will be 4, and if the TDD uplink/downlink configuration is the TDD uplink/downlink configuration 5, then the maximum HARQ process number of the TDD carrier will be 15; and for a TB (identified as TB-1), the TB is initially transmitted on the carrier 0 and corresponds to an HARQ process index P, and the TB needs to be retransmitted on the carrier 2, and for another TB (identified as TB-2), the TB is initially transmitted on the carrier 1 and corresponds to the HARQ process index P, and the TB needs to be retransmitted on the carrier 2, that is, the TB will be retransmitted on the changed carrier, particularly as follows:

1) An HARQ process number field is set such that an HARQ process number field in a PDCCH scheduling the FDD carrier can include 3 bits of information, where different states of the 3 bits of information indicate 8 processes on each FDD carrier, which are indexed 0 to 7; and in order to indicate HARQ process numbers corresponding to different TDD uplink/downlink configurations, an HARQ process number field in a PDCCH scheduling the TDD carrier can be set to include 4 bits of information, where different states of the 4 bits of information can indicate at most 15 processes on the TDD carrier, which are indexed 0 to 15, and if the number of processes is less than 15, then only a part of the states can be applied; or in order to schedule uniformly the HARQ process number fields in the PDCCHs scheduling the FDD and TDD carriers, they can be set to include 4 bits of information;

2) A carrier indication field corresponding to the HARQ process number field is set such that if the carrier indication field corresponding to the HARQ process number field can be calculated as a function of the real number of carriers, then the carrier indication field will include $\lceil \log_2 N \rceil = 2$ bits of information in this embodiment, or the carrier indication field can be calculated as a function of the maximum number of aggregated carriers (if $N_{max}=5$), that is, the carrier indication field always include $\lceil \log_2 N_{max} \rceil = 3$ bits of information; and the carrier indication field corresponding to the HARQ process number field indicates a carrier corresponding to an HARQ process/process index indicated by the HARQ process number field;

3) Particular scheduling and transmission:

In a first case relating to self-carrier scheduling, as illustrated in FIG. 3, data transmission on a carrier 1 is scheduled by a PDCCH transmitted on the carrier i; and for initial transmission, the eNB side sends to the UE on the carrier 0 a PDCCH for scheduling TB-1 to be initially transmitted on the carrier 0, and sets an HARQ process number field in the PDCCH (i.e., HARQ-num in the figure) to indicate the process index P a carrier indication field corresponding to the HARQ process number field (i.e., HCIF in the figure) to indicate the carrier index 0, and the NDI to indicate new data (i.e., initial transmission), and sends to the UE on the carrier 1 a PDCCH scheduling TB-2 to be initially transmitted on the carrier 1, and sets an HARQ process number field in the PDCCH (i.e., HARQ-num in the figure) to indicate the process index P, a carrier indication field corresponding to the HARQ process number field (i.e., HCIF in the figure) to indicate the carrier index 1, and the NDI to indicate new data (i.e., initial transmission); and correspondingly then the UE receives the corresponding PDCCH on the carrier 0, and receives TB-1 scheduled by the PDCCH, on the carrier 0, and further determines from the HARQ process number field in the PDCCH, and the HCIF corresponding to the HARQ process number field that TB-1 currently scheduled by the PDCCH corresponds to the HARQ process P on the carrier 0, and determines from the NDI that the data are initially transmitted data, and the UE receives the corresponding PDCCH on the carrier 1, and receives TB-2 scheduled by the PDCCH, on the carrier 1, and further determines from the HARQ process number field in the PDCCH, and the HCIF corresponding to the HARQ process number field that TB-2 currently scheduled by the PDCCH corresponds to the HARQ process P on the carrier 1, and determines from the NDI that the data are initially transmitted data. For retransmission, the eNB side sends to the UE on the carrier 2 a PDCCH for scheduling TB-1 to be retransmitted on the carrier 2, and sets an HARQ process number field in the PDCCH to indicate the process index P, a HCIF corresponding to the HARQ process number field to indicate the carrier index 0, and the NDI to indicate retransmitted data, and sends to the UE on the carrier 2 a PDCCH for scheduling TB-2 to be retransmitted on the carrier 2, and sets an HARQ process number field in the PDCCH to indicate the process index P, a HCIF corresponding to the HARQ process number field to indicate the carrier index 1, and the NDI to indicate retransmitted data; and correspondingly then the UE receives the corresponding PDCCH on the carrier 2, and receives TB-1 scheduled by the PDCCH, on the carrier 2, and further determines from the HARQ process number field in the PDCCH, and the HCIF corresponding to the HARQ process number field that TB-1 currently scheduled by the PDCCH corresponds to the HARQ process P on the carrier 0, and determines from the NDI that the data are retransmitted data, and the UE receives the corresponding PDCCH on the carrier 2, and receives TB-2 scheduled by the PDCCH, on the carrier 2, and further determines from the HARQ process number field in the PDCCH, and the HCIF corresponding to the HARQ process number field that 1B-2 currently scheduled by the PDCCH corresponds to the HARQ process P on the carrier 1, and determines from the NDI that the data are retransmitted data. Furthermore since the different processes with the same HARQ process index are distinguished by the HCIF (that is, the HARQ processes with the same index on the different carriers are regarded as different HARQ processes), the UE can combine the initially transmitted and retransmitted TB-1 of the HARQ process P corresponding to the carrier 0, and combine the initially transmitted and retransmitted TB-2 of the HARQ process P corresponding to the carrier 1, to obtain a retransmission gain;

In a second case relating to cross-carrier scheduling, as illustrated in FIG. 4, data transmission on both of the carrier 1 and 2 is scheduled by a PDCCH transmitted on the carrier 0, where the carrier 0 is self-carrier scheduled; due to cross-carrier scheduling, the PDCCH at this time further includes a carrier indication field (CIF) for indicating a scheduling relationship between the carriers, where the carrier indication field indicates carrier index of the carrier currently scheduled by the PDCCH; and for initial transmission, the eNB side sends to the UE on the carrier 0 a PDCCH for scheduling TB-1 to be initially transmitted on the carrier 0, and sets an HARQ process number field in the PDCCH (i.e., HARQ-num in the figure) to indicate the process index P, a carrier indication field corresponding to the HARQ process number field (i.e., HCIF in the figure) to indicate the carrier index 0, a carrier indication field for cross-carrier scheduling (i.e., CIF in the figure) to indicate the carrier index 0, and the NDI to indicate new data (i.e., initial transmission), and sends to the UE on the carrier 0 a PDCCH for scheduling TB-2 to be initially transmitted on the carrier 1, and sets an HARQ process number field in the PDCCH (i.e., HARQ-num in the figure) to indicate the process index P, a carrier indication field corresponding to the HARQ process number field (i.e., HCIF in the figure) to indicate the carrier index 1, a carrier indication field for cross-carrier scheduling (i.e., CIF in the figure) to indicate the carrier index 1, and the NDI to indicate new data (i.e., initial transmission); and correspondingly then the UE receives the corresponding PDCCH on the carrier 0, and determines from CIF=0 in the PDCCH that TB-1 scheduled by the PDCCH is received on the carrier 0, and further determines from the HARQ process number field in the PDCCH, and the HCIF corresponding to the HARQ process number field that TB-1 currently scheduled by the PDCCH corresponds to the HARQ process P on the carrier 0, and determines from the NDI that the data are initially transmitted data, and the UE receives the corresponding PDCCH on the carrier 1, and determines from CIF=1 in the PDCCH that TB-2 scheduled by the PDCCH is received on the carrier 1, and further determines from the HARQ process number field in the PDCCH, and the HCIF corresponding to the HARQ process number field that TB-2 currently scheduled by the PDCCH corresponds to the HARQ process P on the carrier 1, and determines from the NDI that the data are initially transmitted data. For retransmission, the eNB side sends to the UE on the carrier 0 a PDCCH for scheduling TB-1 to be retransmitted on the carrier 2, and sets an HARQ process number field in the PDCCH to indicate the process index P, a HCIF corresponding to the HARQ process number field to indicate the carrier index 0, a carrier indication field for cross-carrier scheduling (i.e., CIF in the figure) to indicate the carrier index 2, and the NDI to indicate retransmitted data, and sends to the UE on the carrier 0 a PDCCH for scheduling TB-2 to be retransmitted on the carrier 2, and sets an HARQ process number field in the PDCCH to indicate the process index P, a HCIF corresponding to the HARQ process number field to indicate the carrier index 1, a carrier indication field for cross-carrier scheduling to indicate the carrier index 2, and the NDI to indicate retransmitted data; and correspondingly then the UE receives the corresponding PDCCH on the carrier 0, and determines from CIF=2 in the PDCCH that TB-1 scheduled by the PDCCH is received on the carrier 2, and further determines from the HARQ process number field in the PDCCH, and the HCIF corresponding to the HARQ process number field that TB-1 currently scheduled by the PDCCH corresponds to the HARQ process P on the carrier 0, and determines from the NDI that the data are retransmitted data, and the UE receives the corresponding PDCCH on the carrier 0, and determines from CIF=2 in the PDCCH that TB-2 scheduled by the PDCCH is received on the carrier 2, and further determines from the HARQ process number field in the PDCCH, and the HCIF corresponding to the HARQ process number field that TB-2 currently scheduled by the PDCCH corresponds to the HARQ process P on the carrier 1, and determines from the NDI that the data are retransmitted data. Furthermore the UE can combine the initially transmitted and retransmitted TB-1 of the HARQ process P corresponding to the carrier 0, and combine the initially transmitted and retransmitted TB-2 of the HARQ process P corresponding to the carrier 1, to obtain a retransmission gain;

Fifth Embodiment

Figure 5:
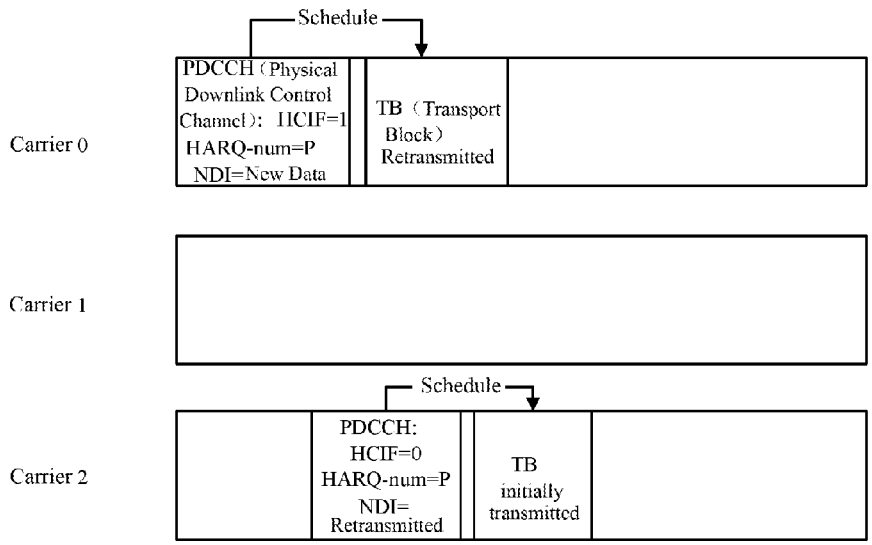
Figure 6:
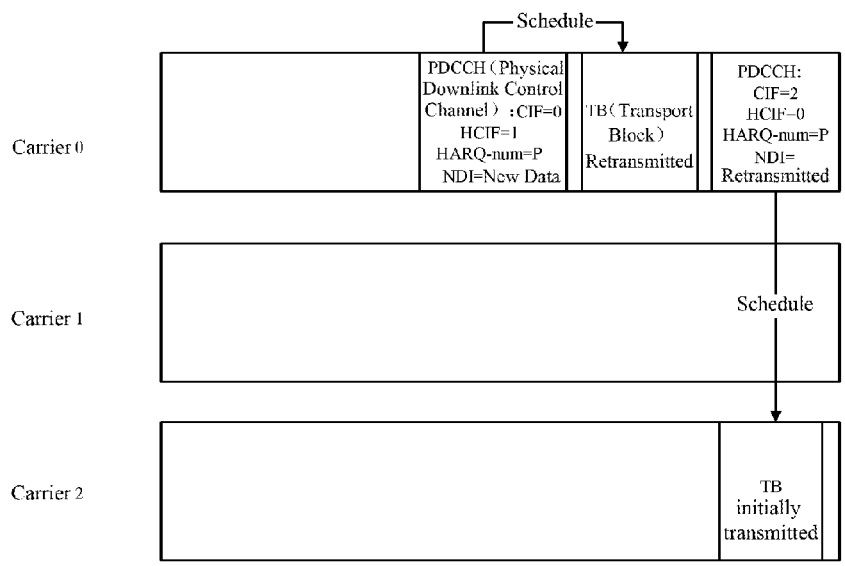

N=3 carriers are aggregated for the UE, and scenarios, and the maximum process numbers of FDD and TDD carriers are the same as described in the fourth embodiment; and for a TB, the TB is initially transmitted on the carrier 2 and corresponds to an HARQ process index P, and the TB needs to be retransmitted on the carrier 0, that is, the TB will be retransmitted on the changed carrier, particularly as follows:

1) An HARQ process number field is set as described in the fourth embodiment, so a repeated description thereof will be omitted here;

2) A carrier indication field corresponding to the HARQ process number field (simply referred to as HCIF) is set so that the carrier indication field corresponding to the HARQ process number field can include 1 bit all the time, for example, in a first pattern, HCIF=0 indicates that an HARQ process/HARQ process index indicated by the HARQ process number field corresponds to an HARQ process/HARQ process index of a carrier scheduled by a PDCCH, and HCIF=1 indicates that an HARQ process/HARQ process index indicated by the HARQ process number field corresponds to an HARQ process/HARQ process index of a predetermined carrier; or vice versa; or in a second pattern, HCIF=0 indicates that an HARQ process/HARQ process index indicated by the HARQ process number field corresponds to an HARQ process/HARQ process index of a carrier scheduled by a PDCCH, and HCIF=1 indicates that an HARQ process/HARQ process index indicated by the HARQ process number field corresponds to an HARQ process/HARQ process index of a carrier on which the PDCCH is transmitted; or vice versa;

3) Particular scheduling and transmission: for the HCIF in the first pattern, firstly the eNB determines as configured or prescribed that the predetermined carrier above is the carrier 2, that is, if HCIF=1 then it will indicate that the HARQ process/HARQ process index indicated by the HARQ process number field is an HARQ process/HARQ process index corresponding to the carrier 0;

In a first case relating to self-carrier scheduling and only applicable to the HCIF in the first pattern, as illustrated in FIG. 5, that is, data transmission on a carrier i is scheduled by a PDCCH transmitted on the carrier i; and for initial transmission, the eNB side sends to the UE on the carrier 2 a PDCCH for scheduling the TB to be initially transmitted on the carrier 2, and sets an HARQ process number field in the PDCCH (i.e., HARQ-num in the figure) to indicate the process index P, a carrier indication field corresponding to the HARQ process number field (i.e., HCIF in the figure) to indicate "0" (which indicates that the HARQ process is a process on a carrier scheduled by the PDCCH, i.e., the carrier 2), and the NDI to indicate new data (i.e., initial transmission); and correspondingly then the UE receives the corresponding PDCCH on the carrier 2, and receives the TB scheduled by the PDCCH, on the carrier 2, and further determines from the HARQ process number field in the PDCCH, and the HCIF corresponding to the HARQ process number field that the TB currently scheduled by the PDCCH corresponds to the HARQ process P on the carrier 2, and determines from the NDI that the data are initially transmitted data. For retransmission, the eNB side sends to the UE on the carrier 0 a PDCCH for scheduling the TB to be retransmitted on the carrier 0, and sets an HARQ process number field in the PDCCH to indicate the process index P, a HCIF corresponding to the HARQ process number field to indicate "1" (which indicates that the HARQ process is a process on a predetermined carrier, i.e., the carrier 2), and the NDI to indicate retransmitted data; and correspondingly then the UE receives the corresponding PDCCH on the carrier 0, and receives the TB scheduled by the PDCCH, on the carrier 0, and further determines from the HARQ process number field in the PDCCH, and the HCIF corresponding to the HARQ process number field that the TB currently scheduled by the PDCCH corresponds to the HARQ process P on the carrier 2, and determines from the NDI that the data are retransmitted data. Furthermore the UE can combine the initially transmitted and retransmitted TBs of the HARQ process P corresponding to the carrier 2, to obtain a retransmission gain;

In a second case relating to cross-carrier scheduling, as illustrated in FIG. 6, data transmission on both of the carrier 1 and 2 is scheduled by a PDCCH transmitted on the carrier 1, where the carrier 0 is self-carrier scheduled; due to cross-carrier scheduling, the PDCCH at this time further includes a carrier indication field (CIF) for indicating a scheduling relationship between the carriers, where the carrier indication field indicates the carrier index of the carrier currently scheduled by the PDCCH; and for initial transmission, the eNB side sends to the UE on the carrier 0 a PDCCH for scheduling the TB to be initially transmitted on the carrier 2, and sets an HARQ process number field in the PDCCH (i.e., HARQ-num in the figure) to indicate the process index P, a carrier indication field corresponding to the HARQ process number field (i.e., HCIF in the figure) to indicate "0" (that is, which indicates that the HARQ process is a process on a carrier scheduled by the PDCCH, i.e., the carrier 2, in the first pattern or the second pattern), an cross-carrier scheduling carrier indication field (i.e., CIF in the figure) to indicate the carrier index 2, and the NDI to indicate new data (i.e., initial transmission); and correspondingly then the UE receives the corresponding PDCCH on the carrier 0, and determines from CIF=2 in the PDCCH that the TB scheduled by the PDCCH is received on the carrier 2, and further determines from the HARQ process number field in the PDCCH, and the HCIF corresponding to the HARQ process number field that TB-1 currently scheduled by the PDCCH corresponds to the HARQ process P on the carrier 2, and determines from the NDI that the data are initially transmitted data. For retransmission, the eNB side sends to the UE on the carrier 0 a PDCCH for scheduling the TB to be retransmitted on the carrier 0, and sets an HARQ process number field in the PDCCH to indicate the process index P, a HCIF corresponding to the HARQ process number field to indicate "1" (that is, which indicates that the HARQ process is a process on a predetermined carrier (i.e., the carrier 0), in the first pattern, and that the HARQ process is a process on a carrier on which the PDCCH is transmitted (i.e., the carrier 0), in the second pattern), an cross-carrier scheduling carrier indication field (i.e., CIF in the figure) to indicate the carrier index 0, and the NDI to indicate retransmitted data; and correspondingly then the UE receives the corresponding PDCCH on the carrier 0, and determines from CIF=0 in the PDCCH that the TB scheduled by the PDCCH is received on the carrier 0, and further determines from the HARQ process number field in the PDCCH, and the HCIF corresponding to the HARQ process number field that the TB currently scheduled by the PDCCH corresponds to the HARQ process P on the carrier 2, and determines from the NDI that the data are retransmitted data. Furthermore the UE can combine the initially transmitted and retransmitted TBs of the HARQ process P corresponding to the carrier 2, to obtain a retransmission gain; and In the fifth embodiment above, if there are a number of TBs corresponding to the same HARQ process index on the same carrier, then they can distinguished by the HCIF, particularly in a similar way to the fourth embodiment, so a repeated description thereof will be omitted here.

It shall be noted that both the index of the HARQ process, and the carrier index in the embodiment above start with the index 0; and moreover the carrier index may alternatively start with the index 1, and the approach above will be also applicable thereto, so a repeated description thereof will be omitted here.

It shall be noted that in order to avoid the problem of serious interference on a carrier occupying an unlicensed spectrum resource, if the initial transmission carrier above is a carrier on an unlicensed spectrum resource, then if serious interference on the unlicensed spectrum resource is detected, then the retransmission carrier can be selected as a carrier on a licensed spectrum resource to thereby guarantee the quality of retransmission.

With the technical solutions above according to the invention, the transmission carriers on which the data in the same process are initially transmitted and retransmitted can be adjusted flexibly so that if there is serious interference on some one or more carriers, then the data transmitted in the process will be switched to be transmitted on a carrier with low interference so as to improve the transmission performance of the LTE system on the unlicensed spectrum resource and the transmission efficiency of the system.

There is further provided an apparatus for transmitting data according to an embodiment of the invention, which can be arranged at the UE side, or integrated together with an existing functional module of a UE to receive data.

Figure 7:
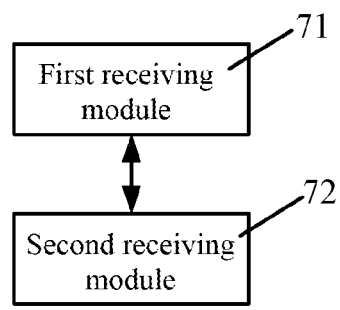
FIG. 7 is a block diagram of a data transmission apparatus (at the UE side) according to an embodiment of the invention.

As illustrated in FIG. 7, the data transmission apparatus according to the invention includes:

A first receiving module 71 is configured to receive a PDCCH including indication field which can indicate at least different HARQ processes, the number of which is the sum of the maximum HARQ process numbers of a plurality of carriers, where data in the same HARQ process are initially transmitted and retransmitted on different carriers; and A second receiving module 72 is configured to receive data scheduled by the PDCCH, according to the PDCCH.

The indication field in the PDCCH can indicate the HARQ processes in the following schemes as described below.

First Scheme

In an embodiment, the plurality of carriers include FDD carriers and/or TDD carriers, and the indication field includes $\lceil \log_2 A \rceil$ bits of information, where A is determined in one of:

$$A = \sum_{i=0}^{N-1} X_i, A = N \times \max_{0 \leq i \leq N-1}(X_i), A = N \times X_{max}^{FDD}, A = N \times X_{max}^{TDD},$$

$$A = N \times X_{max}, A = N_{max} \times \max_{0 \leq i \leq N-1}(X_i), A = N_{max} \times X_{max}^{FDD},$$

$$A = N_{max} \times X_{max}^{TDD}, \text{ and } A = N_{max} \times X_{max};$$

Where i represents a carrier index, X, represents the maximum HARQ process number of a carrier indexed i, N represents the number of configured or activated carriers. $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ the maximum one among the maximum HARQ process numbers of the respective FDD and TDD carriers, and $N_{max}$ represents a predetermined maximum number of configured or activated carriers.

In another embodiment, the plurality of carriers include only FDD carriers, each of which has the same maximum HARQ process number, and the indication field includes $\lceil \log_2 A \rceil$ bits of information, where A, is determined in one of $A=N \times X$, and $A=N_{max} \times X$; where N represents the number of configured or activated carriers, X represents the maximum HARQ process number of each FDD carrier, and $N_{max}$ represents a predetermined maximum number of configured or activated carriers.

In another embodiment, the carriers include FDD carriers and/or TDD carriers, and the indication field includes $\lceil \log_2 A \rceil$ bits of information, where A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

$$A = N_1 \times X_{max}^{FDD} + N_2 \times X_{max}^{TDD}, A = \sum_{i \in A1} X_i^{FDD} + N_2 \times X_{max}, \text{ and}$$

$$A = N_1 \times X_{max} + \sum_{j \in A2} X_j^{TDD};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

In another embodiment, the plurality of carriers include FDD carriers and/or TDD carriers, and if the maximum HARQ process number of each of the FDD carriers is X, then the indication field includes $\lceil \log_2 A \rceil$ bits of information, where A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, represents the maximum one among the maximum HARQ process numbers of the respective TDD carriers, and $X_{max}$ represents the maximum one among the maximum HARQ process numbers of the respective FDD and TDD carriers.

In another embodiment, the indication field includes 7 bits of information; or if all the carriers are FDD carriers, then the indication field includes 6 bits of information; or if all the carriers are TDD carriers or both FDD and TDD carriers, then the indication field includes 7 bits of information.

Second Scheme

The indication field in the PDCCH indicates the different HARQ processes, the number of which is the sum of the maximum HARQ process numbers of the plurality of carriers, in one of the following approaches:

In an approach A, the indication field includes an HARQ process number field, and a carrier indication field corresponding to the HARQ process number field, where the HARQ process number field indicates an HARQ process/

HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field; and the second receiving module is configured to receive the data scheduled by the PDCCH, on a carrier scheduled by the PDCCH;

In an approach B, the indication field includes an HARQ process number field, and a carrier indication field corresponding to the HARQ process number field, where the HARQ process number field indicates an HARQ process/HARQ process index on a carrier scheduled by the PDCCH, and the carrier indication field corresponding to the HARQ process number field indicates a carrier on which data in the HARQ process are transmitted; and the second receiving module is configured to receive the data scheduled by the PDCCH, on the carrier indicated by the carrier indication field corresponding to the HARQ process number field;

For the approach A, the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ process index on a predetermined carrier; or If the PDCCH uses cross-carrier scheduling, then two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ process index on a carrier on which the PDCCH is transmitted; or The carrier indication field corresponding to the HARQ process number field includes at least $\lceil \log_2 N' \rceil$ bits of information indicating at least N' carriers, where N' represents the number N of configured or activated carriers or a predetermined maximum number $N_{max}$ of configured or activated carriers; or The carrier indication field corresponding to the HARQ process number field includes 3 bits of information.

For the approach B, the carrier indication field corresponding to the HARQ process number field includes 1 bit of information, and two different bit states of the 1 bit of information indicates respectively that: the data in the HARQ process indicated by the HARQ process number field are transmitted on the carrier scheduled by the PDCCH, and the data in the HARQ process indicated by the HARQ process number field are transmitted on a predetermined carrier; or If the PDCCH uses cross-carrier scheduling, then two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted; or The carrier indication field corresponding to the HARQ process number field includes at least $\lceil \log_2 N' \rceil$ bits of information indicating at least N' carriers, where N' represents the number N of configured or activated carriers or a predetermined maximum number $N_{max}$ of configured or activated carriers; or The carrier indication field corresponding to the HARQ process number field includes 3 bits of information.

For the approach A and the approach B, the HARQ process number field indicates $X_{max}$ or $X_{max}^{FDD}$ or $X_{max}^{TDD}$ different HARQ processes, where $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

There is further provided a data transmission apparatus according to an embodiment of the invention, which can be arranged at the eNB side, or integrated together with an existing functional module of an eNB to send data.

Figure 8:
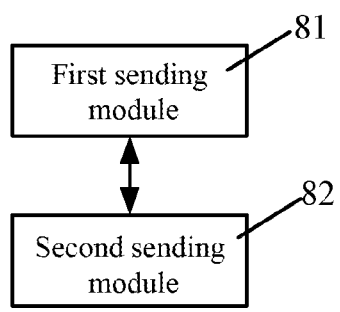
FIG. 8 is a block diagram of a data transmission apparatus (at the eNB side) according to an embodiment of the invention.

As illustrated in FIG. 8, the data transmission apparatus according to the invention includes:

A first sending module 81 is configured to send a PDCCH including indication field which can indicate at least different HARQ processes, the number of which is the SUM of the maximum HARQ process numbers of a plurality of carriers, where data in the same HARQ process are initially transmitted and retransmitted on different carriers; and A second sending module 82 is configured to send data scheduled by the PDCCH.

The indication field in the PDCCH can indicate the HARQ processes in the following schemes as described below First Scheme In an embodiment, the carriers include FDD carriers and/or TDD carriers, and the indication field includes $\lceil \log_2 A \rceil$ bits of information, where A is determined in one of:

$$A = \sum_{i=0}^{N-1} X_i, A = N \times \max_{0 \leq i \leq N-1}(X_i), A = N \times X_{max}^{FDD}, A = N \times X_{max}^{TDD},$$

$$A = N \times X_{max}, A = N_{max} \times \max_{0 \leq i \leq N-1}(X_i), A = N_{max} \times X_{max}^{FDD},$$

$$A = N_{max} \times X_{max}^{TDD}, \text{ and } A = N_{max} \times X_{max};$$

Where i represents a carrier index, X represents the maximum HARQ process number of a carrier indexed i, N represents the number of configured or activated carriers, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and $N_{max}$ represents a predetermined maximum number of configured or activated carriers.

In another embodiment, the carriers include only FDD carriers, each of which has the same maximum HARQ process number, and the indication field includes $\lceil \log_2 A \rceil$ bits of information, where A is determined in one of: $A=N \times X$ and $A=N_{max} \times X$; where N represents the number of configured or activated carriers, X represents the maximum HARQ process number of each FDD carrier, and $N_{max}$ represents a predetermined maximum number of configured or activated carriers.

In another embodiment, the carriers include FDD carriers and/or TDD carriers, and the indication field includes $\lceil \log_2 A \rceil$ bits of information, where A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

$$A = N_1 \times X_{max}^{FDD} + N_2 \times X_{max}^{TDD}, A = \sum_{i \in A1} X_i^{FDD} + N_2 \times X_{max}, \text{ and}$$

$$A = N_1 \times X_{max} + \sum_{j \in A2} X_j^{TDD};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, $X_{max}$ represents the maximum one among the maximum HARQ process numbers of the respective FDD and TDD carriers, and N a predetermined maximum number of configured or activated carriers.

In another embodiment, the plurality of carriers include FDD carriers and/or TDD carriers, and if the maximum HARQ process number of each of the FDD carriers is X, then the indication field includes $\lceil \log_2 A \rceil$ bits of information, where A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

Where i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents the maximum HARQ process number of the FDD carrier indexed i, $X_j^{TDD}$ represents the maximum HARQ process number of the TDD carrier indexed j, $N_1$ represents the number of configured or activated FDD carriers, $N_2$ represents the number of configured or activated TDD carriers, $N_1$ and $N_2$ are integers more than or equal to 0, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

In anther embodiment, the indication field includes 7 bits of information; or if all the carriers are FDD carriers, then the indication field includes 6 bits of information; or if all the carriers are TDD carriers or both FDD and TDD carriers, then the indication field includes 7 bits of information.

Second Scheme

The indication field in the PDCCH indicates the different HARQ processes, the number of which is the sum of the maximum HARQ process numbers of the plurality of carriers, in one of the following approaches:

In an approach A, the indication field includes an HARQ process number field, and a carrier indication field corresponding to the HARQ process number field, where the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field; and the second sending module is configured to send the data scheduled by the PDCCH, on a carrier scheduled by the PDCCH;

In an approach B, the indication field includes an HARQ process number field, and a carrier indication field corresponding to the HARQ process number field, where the HARQ process number field indicates an HARQ process/HARQ process index on a carrier scheduled by the PDCCH, and the carrier indication field corresponding to the HARQ process number field indicates a carrier on which data in the HARQ process are transmitted; and the second sending module is configured to send the data scheduled by the PDCCH, on the carrier indicated by the carrier indication field corresponding to the HARQ process number field;

For the approach A, the carrier indication field corresponding to the HARQ process number field includes 1 bit of information, and two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ process index on a predetermined carrier; or If the PDCCH uses cross-carrier scheduling, then two different bit states of the 1 bit of information indicate respectively that: the HARQ process/HARQ process index indicated by the HARQ process number field corresponds to a HARQ process/HARQ process index on the carrier scheduled by the PDCCH, and the HARQ process/HARQ process index indicated by the HARQ number indication field corresponds to an HARQ process/HARQ process index on a carrier on which the PDCCH is transmitted; or The carrier indication field corresponding to the HARQ process number field includes at least $\lceil \log_2 N' \rceil$ bits of information indicating at least N' carriers, where N' represents the number N of configured or activated carriers or a predetermined maximum number of configured or activated carriers; or The carrier indication field corresponding to the HARQ process number field includes 3 bits of information.

For the approach B, the carrier indication field corresponding to the HARQ process number field includes 1 bit of information, and two different bit states of the 1 bit of information indicates respectively that: the data in the HARQ process indicated by the HARQ process number field are transmitted on the carrier scheduled by the PDCCH, and the data in the HARQ process indicated by the HARQ process number field are transmitted on a predetermined carrier; or If the PDCCH uses cross-carrier scheduling, then two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted; or The carrier indication field corresponding to HARQ process number field includes at least $\lceil \log_2 N' \rceil$ bits of information indicating at least N' carriers, where N' represents the number N of configured or activated carriers or a predetermined maximum number $N_{max}$ of configured or activated carriers; or The carrier indication field corresponding to the HARQ process number field includes 3 bits of information.

For the approach A and the approach B, the HARQ process number field indicates $X_{max}$ or $X_{max}^{FDD}$ or $X_{max}^{TDD}$ different HARQ processes, where $X_{max}^{FDD}$ represents the maximum one of the maximum HARQ process numbers of the respective FDD carriers, $X_{max}^{TDD}$ represents the maximum one of the maximum HARQ process numbers of the respective TDD carriers, and $X_{max}$ represents the maximum one of the maximum HARQ process numbers of the respective FDD and TDD carriers.

In summary, with the technical solutions according to the invention, the transmission carriers on which the data in the same process are initially transmitted and retransmitted can be adjusted flexibly (any data transmission process can be adjusted flexibly so that the data are transmitted on any carrier) so that if there is serious interference on some one or more carriers, then the data transmitted in the process will be switched to be transmitted on a carrier with low interference; and the technical solutions according to the invention can be applicable to a number of scenarios so as to improve the transmission performance. For example, the inventive solutions can improve in effect the transmission performance of the LTE system on an unlicensed spectrum resource and alleviate an adverse effect of interference on data transmission.

The underlying principle of the invention has been described above in connection with the particular embodiments thereof, but it shall be noted that those ordinarily skilled in the art can appreciate that all or any of the steps or components in the methods and apparatuses according to the invention can be embodied in hardware, firmware, software, or a combination thereof in any computing device (including a processor, a storage medium, etc.) or network of computing devices, and this can be achieved by those ordinarily skilled in the art employing their general programming skills upon reading the disclosure of the invention.

Thus the object of the invention can also be attained by running a program or a set of programs on any computing device which can be a well-known general-purpose device. Thus the object of the invention can also be attained by providing only a program product including program codes for embodying the methods or apparatuses. That is, such a program product also constitutes the invention, and a storage medium in which such a program product is stored also constitutes the invention. Apparently the storage medium can be any well-known storage medium or any storage medium to be developed later.

There is provided a storage medium according to an embodiment of the invention, in which there is stored a computer program for receiving data in the steps of: receiving a PDCCH including indication field which can indicate at least different HARQ processes, the number of which is the sum of the maximum HARQ process numbers of a plurality of carriers, where data in the same HARQ process are initially transmitted and retransmitted on different carriers; and receiving data scheduled by the PDCCH, according to the PDCCH.

There is provided a storage medium according to an embodiment of the invention, in which there is stored a computer program for sending data in the steps of: sending a PDCCH including indication field which can indicate at least different HARQ processes, the number of which is the sum of the maximum HARQ process numbers of a plurality of carriers, where data in the same HARQ process are initially transmitted and retransmitted on different carriers; and sending data scheduled by the PDCCH.

There is provided a computer program according to an embodiment of the invention, which is configured with code segments for receiving data in the steps of: receiving a PDCCH including indication field which can indicate at least different HARQ processes, the number of which is the sum of the maximum HARQ process numbers of a plurality of carriers, where data in the same HARQ process are initially transmitted and retransmitted on different carriers; and receiving data scheduled by the PDCCH, according to the PDCCH.

There is provided a computer program according to an embodiment of the invention, which is configured with code segments for sending data in the steps of: sending a PDCCH including indication field which can indicate at least different HARQ processes, the number of which is the sum of the maximum HARQ process numbers of a plurality of carriers, where data in the same HARQ process are initially transmitted and retransmitted on different carriers and sending data scheduled by the PDCCH.

In the case that the embodiments of the invention are embodied in software or firmware, program constituting the software or firmware can be installed from a storage medium or a network to a machine with a dedicated hardware structure (e.g., a general-purpose machine 900 illustrated in FIG. 9) which can perform various functions of the units, sub-units, modules, etc., above when various pieces of programs are installed thereon.

Figure 9:
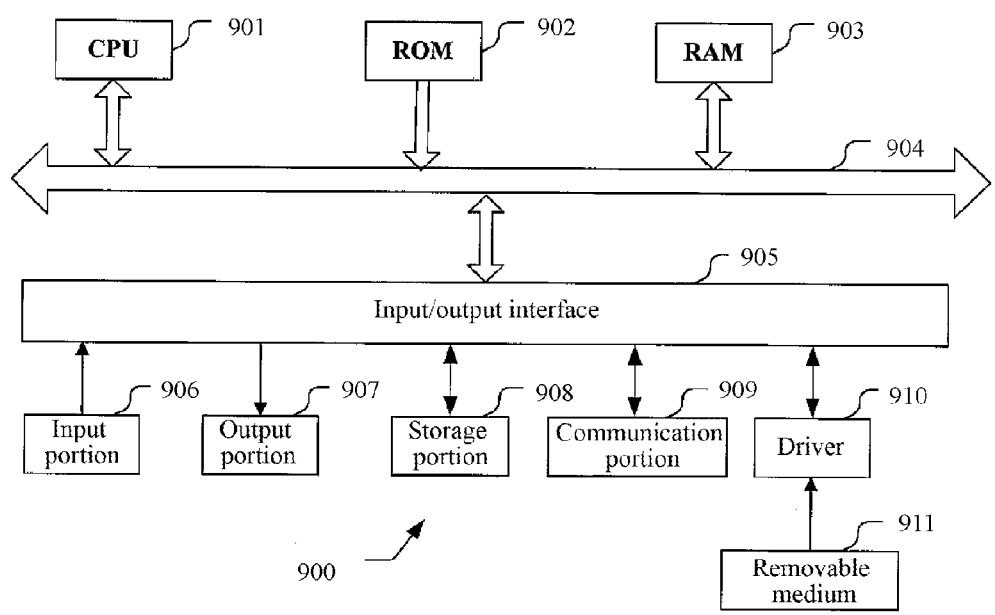
FIG. 9 is a structural diagram of a computer in which the technical solution according to the invention can be embodied.

In FIG. 9, a Central Processing Unit (CPU) 901 performs various processes according to program stored in a Read Only Memory (ROM) 902 or loaded from a storage portion 908 into a Random Access Memory (RAM) 903 in which data required when the CPU 901 performs the various processes, etc., is also stored as needed. The CPU 901, the ROM 902, and the RAM 903 are connected to each other via a bus 904 to which an input/output interface 905 is also connected.

The following components are connected to the input/output interface 905: an input portion 906 (including a keyboard, a mouse, etc.), an output portion 907 (including a display, e.g., a Cathode Ray Tube (CRT), a Liquid Crystal Display (LCD), etc., a speaker etc.), a storage port 908 (including a hard disk, etc.), and a communication portion 909 (including a network interface card, e.g., an LAN card, an MODEM, etc.). The communication portion 909 performs a communication process on a network, e.g., the Internet.

A driver 910 is also connected to the input/output interface 905 as needed. A removable medium 911, e.g., a magnetic disk, an optical disk, an optic-magnetic disk, a semiconductor memory, etc., can be installed on the driver 910 as needed so that computer program fetched therefrom can be installed into the storage portion 908 as needed.

In the case that the foregoing series of processes are performed in software, program constituting the software can be installed from a network, e.g., the Internet, etc., or a storage medium, e.g., the removable medium 911, etc.

Those skilled in the art shall appreciate that such a storage medium will not be limited to the removable medium 911 illustrated in FIG. 10 in which the program is stored and which is distributed separately from the apparatus to provide a user with the program. Examples of the removable medium 911 include a magnetic disk (including a Floppy Disk), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 902, a hard disk included in the storage port 908, etc., in which the program is stored and which is distributed together with the apparatus including the same to the user.

It shall be further noted that apparently the respective components or steps in the apparatuses and methods according to the invention can be decomposed and/or recombined. These decompositions and/or recombinations shall be regarded as equivalent solutions of the invention. Furthermore the steps of performing the foregoing series of processes can naturally be performed in a temporal sequence in the described order but may not necessarily be performed in a temporal sequence. Some of the steps can be performed concurrently or independently of each other.

Although the invention and the advantages thereof have been described in details, it shall be appreciated that various changes, substitutions, and variations can be made without departing from the spirit and scope of the invention as defined in the appended claims. Furthermore the terms "include", "comprise" and any variants thereof in the context are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The invention claimed is:

1. A data transmission method, the method comprising:
receiving a Physical Downlink Control Channel (PDCCH) comprising indication field which can indicate at least different Hybrid Automatic Repeated Request (HARQ) processes, a quantity of which is a sum of maximum HARQ process numbers of a plurality of carriers, wherein data in a same HARQ process are initially transmitted and retransmitted on different carriers; and
receiving data scheduled by the PDCCH, according to the PDCCH;
wherein the indication field indicates jointly the quantity of HARQ processes on the carriers, or the indication field comprises an HARQ process number field and a carrier indication field corresponding to the HARQ process number field; and
in a case of the indication field indicates jointly the quantity of HARQ processes on the carriers, the indication field in the PDCCH indicates at least different HARQ processes, the quantity of which is the sum of maximum HARQ process numbers of the plurality of carriers, comprises:
the plurality of carriers comprise Frequency Division Duplex (FDD) carriers, or Time Division Duplex (TDD) carriers, or at least one FDD carrier and one TDD carrier, and the indication field comprises $\lceil \log_2 A \rceil$ bits of information, wherein A is determined in one of:

$$A = \sum_{i=0}^{N-1} X_i, A = N \times \max_{0 \leq i \leq N-1}(X_i), A = N \times X_{max}^{FDD}, A = N \times X_{max}^{TDD},$$

$$A = N \times X_{max}, A = N_{max} \times \max_{0 \leq i \leq N-1}(X_i), A = N_{max} \times X_{max}^{FDD},$$

$$A = N_{max} \times X_{max}^{TDD}, \text{ and } A = N_{max} \times X_{max};$$

wherein i represents a carrier index, $X_i$ represents a maximum HARQ process number of a carrier indexed i, N represents a quantity of configured or activated carriers, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers and $N_{max}$ represents a predetermined maximum number of configured or activated carriers; or the plurality of carriers comprise only FDD carriers, each of which has a same maximum HARQ process number, and the indication field comprises $\lceil \log_2 A \rceil$ bits of information, wherein A is determined in one of:
A=N×X, and A=$N_{max}$×X; wherein N represents a quantity of configured or activated carriers, X represents a maximum HARQ process number of each FDD carrier, and $N_{max}$ represents a predetermined maximum number of configured or activated carriers; or the plurality of carriers comprise FDD carriers, or TDD carriers, or at least one FDD carrier and one TDD carrier, and the indication field comprises $\lceil \log_2 A \rceil$ bits of information, wherein A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

$$A = N_1 \times X_{max}^{FDD} + N_2 \times X_{max}^{TDD}, A = \sum_{i \in A1} X_i^{FDD} + N_2 \times X_{max},$$

$$\text{and } A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed i, $N_1$ represents a quantity of configured or activated FDD carriers, $N_2$ represents a quantity of configured or activated TDD carriers, $N_1$ and $N_2$ are integers more than or equal to 0, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers, and $N_{max}$ represents a predetermined maximum number of configured or activated carriers; or the plurality of carriers comprise FDD carriers, or TDD carriers, or at least one FDD carrier and one TDD carrier, and if the maximum HARQ process number of each of the FDD carriers is X, then the indication field comprises $\lceil \log_2 A \rceil$ bits of information, wherein A is determined in one of:

$$A = N_1 \times X + \sum_{j \in A2} X_j^{TDD}, \quad A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed j, $N_1$ represents a quantity of configured or activated FDD carriers, $N_2$ represents a quantity of configured or activated TDD carriers, $N_1$ and $N_2$ are integers more than or equal to 0, $X_{max}^{TDD}$ represents a maximum one among the maximum HARQ process numbers of the respective TDD carriers, and $X_{max}$ represents a maximum one among the maximum HARQ process numbers of the respective FDD and TDD carriers; or the indication field comprises 7 bits of information; or if all the carriers are FDD carriers, then the indication field comprises 6 bits of information; or if all the carriers are TDD carriers or both FDD and TDD carriers, then the indication field comprises 7 bits of information;

in a case of the indication field comprises the HARQ process number field and the carrier indication field corresponding to the HARQ process number field, the indication field in the PDCCH indicates at least the different HARQ processes, the quantity of which is the sum of the maximum HARQ process numbers of the plurality of carriers, comprises:

Approach A: the indication field comprises the HARQ process number field, and the carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field; or Approach B: the indication field comprises the HARQ process number field, and the carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process are transmitted.

2. The data transmission method according to claim 1, wherein for the approach A: the carrier indication field corresponding to the HARQ process number field comprises 1 bit of information, and two different bit states of the 1 bit of information indicate respectively that: the HARQ process/HARQ process index indicated by the HARQ process number field corresponds to an HARQ process/HARQ process index on a carrier scheduled by the PDCCH, and the HARQ process/HARQ process index indicated by the HARQ number indication field corresponds to an HARQ process/HARQ process index on a predetermined carrier; or if the PDCCH uses cross-carrier scheduling, then two different bit states of the 1 bit of information indicate respectively that: the HARQ process/HARQ process index indicated by the HARQ process number field corresponds to an HARQ process/HARQ process index on a carrier scheduled by the PDCCH, and the HARQ process/HARQ process index indicated by the HARQ number indication field corresponds to an HARQ process/HARQ process index on a carrier on which the PDCCH is transmitted.

3. The data transmission method according to claim 1, wherein the carrier indication field corresponding to the HARQ process number field comprises 3 bits of information:

or, wherein the carrier indication field corresponding to the HARQ process number field comprises at least $\lceil \log_2 N' \rceil$ bits of information indicating at least N' carriers, wherein N' represents the number N of configured or activated carriers, or a predetermined maximum number $N_{max}$ of configured or activated carriers.

4. The data transmission method according to claim 1, wherein for the approach B:

the carrier indication field corresponding to the HARQ process number field comprises 1 bit of information, and two different bit states of the 1 bit of information indicates respectively that: the data in the HARQ process indicated by the HARQ process number field are transmitted on a carrier scheduled by the PDCCH, and the data in the HARQ process indicated by the HARQ process number field are transmitted on a predetermined carrier; or if the PDCCH uses cross-carrier scheduling, then two different bit states of the 1 bit of information indicate respectively that: the data in the HARQ process indicated by the HARQ process number field are transmitted on a carrier scheduled by the PDCCH, and the data in the HARQ process indicated by the HARQ process number field are transmitted on a carrier on which the PDCCH is transmitted.

5. The data transmission method according to claim 1, wherein the HARQ process number field indicates $X_{max}$ or $X_{max}^{FDD}$ or $X_{max}^{TDD}$ different HARQ processes, wherein $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

6. A data transmission method, the method comprising:
sending a PDCCH comprising indication field which can indicate at least different HARQ processes, a quantity of which is a sum of maximum HARQ process numbers of a plurality of carriers, wherein data in a same HARQ process are initially transmitted and retransmitted on different carriers; and
sending data scheduled by the PDCCH;
wherein the indication field indicates jointly the quantity of HARQ processes on the carriers, or the indication field comprises an HARQ process number field and a carrier indication field corresponding to the HARQ process number field; and
in a case of the indication field indicates jointly the quantity of HARQ processes on the carriers, the indication field in the PDCCH indicates at least different HARQ processes, the quantity of which is the sum of maximum HARQ process numbers of the plurality of carriers, comprises:
the plurality of carriers comprise FDD carriers, or TDD carriers, or at least one FDD carrier and one TDD carrier, and the indication field comprises $\lceil \log_2 A \rceil$ bits of information, wherein A is determined in one of:

$$A = \sum_{i=0}^{N-1} X_i, A = N \times \max_{0 \le i \le N-1}(X_i), A = N \times X_{max}^{FDD}, A = N \times X_{max}^{TDD},$$

$$A = N \times X_{max}, A = N_{max} \times \max_{0 \le i \le N-1}(X_i), A = N_{max} \times X_{max}^{FDD},$$

$$A = N_{max} \times X_{max}^{TDD}, \text{ and } A = N_{max} \times X_{max};$$

wherein i represents a carrier index, $X_i$ represents a maximum HARQ process number of a carrier indexed i, N represents a quantity of configured or activated carriers, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers, and $N_{max}$ represents a predetermined maximum number of configured or activated carriers; or
the plurality of carriers comprise only FDD carriers, each of which has a same maximum HARQ process number, and the indication field comprises $\lceil \log_2 A \rceil$ bits of information, wherein A is determined in one of: $A = N \times X$, and $A = N_{max} \times X$; wherein N represents a quantity of configured or activated carriers, X represents a maximum HARQ process number of each FDD carrier, and $N_{max}$ represents a predetermined maximum number of configured or activated carriers; or
the plurality of carriers comprise FDD carriers, or TDD carriers, or at least one FDD carrier and one TDD carrier, and the indication field comprises $\lceil \log_2 A \rceil$ bits of information, wherein A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

$$A = N_1 \times X_{max}^{FDD} + N_2 \times X_{max}^{TDD}, A = \sum_{i \in A1} X_i^{FDD} + N_2 \times X_{max},$$

$$\text{and } A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed j, $N_1$ represents a quantity of configured or activated FDD carriers, $N_2$ represents a quantity of configured or activated TDD carriers, $N_1$ and $N_2$ are integers more than or equal to 0, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers, and $N_{max}$ represents a predetermined maximum number of configured or activated carriers; or
the plurality of carriers comprise FDD carriers, or TDD carriers, or at least one FDD carrier and one TDD carrier, and if the maximum HARQ process number of each of the FDD carriers is X, then the indication field comprises $\lceil \log_2 A \rceil$ bits of information, wherein A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed j, $N_1$ represents a quantity of configured or activated FDD carriers, $N_2$ represents a quantity of configured or activated TDD carriers, $N_1$ and $N_2$ are integers more than or equal to 0, $X_{max}^{TDD}$ represents a maximum one among the maximum HARQ process numbers of the respective TDD carriers, and $X_{max}$ represents a maximum one among the maximum HARQ process numbers of the respective FDD and TDD carriers; or
the indication field comprises 7 bits of information; or if all the carriers are FDD carriers, then the indication field comprises 6 bits of information; or if all the carriers are TDD carriers or both FDD and TDD carriers, then the indication field comprises 7 bits of information;

in a case of the indication field comprises the HARQ process number field and the carrier indication field corresponding to the HARQ process number field, the indication field in the PDCCH indicates at least the different HARQ processes, the quantity of which is the sum of the maximum HARQ process numbers of the plurality of carriers, comprises:

Approach A: the indication field comprises the HARQ process number field, and the carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field; or Approach B: the indication field comprises the HARQ process number field, and the carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process are transmitted.

7. The data transmission method according to claim 6, wherein for the approach A: the carrier indication field corresponding to the HARQ process number field comprises 1 bit of information, and two different bit states of the 1 bit of information indicate respectively that: the HARQ process/HARQ process index indicated by the HARQ process number field corresponds to an HARQ process/HARQ process index on a carrier scheduled by the PDCCH, and the HARQ process/HARQ process index indicated by the HARQ number indication field corresponds to an HARQ process/HARQ process index on a predetermined carrier; or if the PDCCH uses cross-carrier scheduling, then two different bit states of the 1 bit of information indicate respectively that: the HARQ process/HARQ process index indicated by the HARQ process number field corresponds to an HARQ process/HARQ process index on a carrier scheduled by the PDCCH, and the HARQ process/HARQ process index indicated by the HARQ number indication field corresponds to an HARQ process/HARQ process index on a carrier on which the PDCCH is transmitted.

8. The data transmission method according to claim 6, wherein the carrier indication field corresponding to the HARQ process number field comprises 3 bits of information; or the carrier indication field corresponding to the HARQ process number field comprises at least $\lceil \log_2 N' \rceil$ bits of information indicating at least N' carriers wherein N' represents the number N of configured or activated carriers, or a predetermined maximum number $N_{max}$ of configured or activated carriers.

9. The data transmission method according to claim 6, wherein for the approach B: the carrier indication field corresponding to the HARQ process number field comprises 1 bit of information, and two different bit states of the 1 bit of information indicates respectively that: the data in the HARQ process indicated by the HARQ process number field are transmitted on a carrier scheduled by the PDCCH, and the data in the HARQ process indicated by the HARQ process number field are transmitted on a predetermined carrier; or if the PDCCH uses cross-carrier scheduling, then two different bit states of the 1 bit of information indicate respectively that: the data in the HARQ process indicated by the HARQ process number field are transmitted on a carrier scheduled by the PDCCH, and the data in the HARQ process indicated by the HARQ process number field are transmitted on a carrier on which the PDCCH is transmitted.

10. The data transmission method according to claim 6, wherein the HARQ process number field indicates $X_{max}$ or $X_{max}^{FDD}$ or $X_{max}^{TDD}$ different HARQ processes, wherein $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

11. A data transmission apparatus, the apparatus comprising:

one or more processors, and a memory storing a computer program; wherein the one or more processors are configured to read the computer program stored in the memory to:

receive a PDCCH comprising indication field which can indicate at least different HARQ processes, a quantity of which is a sum of maximum HARQ process numbers of a plurality of carriers, wherein data in a same HARQ process are initially transmitted and retransmitted on different carriers; and receive a data scheduled by the PDCCH, according to the PDCCH;

wherein the indication field indicates jointly the quantity of HARQ processes on the carriers, or the indication field comprises an HARQ process number field and a carrier indication field corresponding to the HARQ process number field; and in a case of the indication field indicates jointly the quantity of HARQ processes on the carriers, the indication field in the PDCCH indicates at least different HARQ processes, the quantity of which is the sum of maximum HARQ process numbers of the plurality of carriers, comprises;

the plurality of carriers comprise FDD carriers, or TDD carriers, or at least one FDD carrier and one TDD carrier, and the indication field comprises $\lceil \log_2 A \rceil$ bits of information wherein A is determined in one of:

$$A = \sum_{i=0}^{N-1} X_i, A = N \times \max_{0 \le i \le N-1}(X_i), A = N \times X_{max}^{FDD}, A = N \times X_{max}^{TDD},$$

$$A = N \times X_{max}, A = N_{max} \times \max_{0 \le i \le N-1}(X_i), A = N_{max} \times X_{max}^{FDD},$$

$$A = N_{max} \times X_{max}^{TDD}, \text{ and } A = N_{max} \times X_{max};$$

wherein i represents a carrier index, $X_i$ represents a maximum HARQ process number of a carrier indexed i, N represents a quantity of configured or activated carriers, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers, and $N_{max}$ represents a predetermined maximum number of configured or activated carriers; or the plurality of carriers comprise only FDD carriers, each of which has a same maximum HARQ process number, and the indication field comprises $\lceil \log_2 A \rceil$ bits of information, wherein A is determined in one of: A=N× X, A=$N_{max}$×X; wherein N represents a quantity of configured or activated carriers, X represents a maximum HARQ process number of each FDD carrier, and $N_{max}$ represents a predetermined maximum number of configured or activated carriers; or the plurality of carriers comprise FDD carriers, or TDD carriers, or at least one FDD carrier and one TDD carrier, and the indication field comprises $\lceil \log_2 A \rceil$ bits of information, wherein A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

$$A = N_1 \times X_{max}^{FDD} + N_2 \times X_{max}^{TDD}, A = \sum_{i \in A1} X_i^{FDD} + N_2 \times X_{max},$$

$$\text{and } A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed j, $N_1$ represents a quantity of configured or activated FDD carriers, $N_2$ represents a quantity of configured or activated TDD carriers, $N_1$ and $N_2$ are integers more than or equal to 0, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers, and $N_{max}$ represents a predetermined maximum number of configured or activated carriers; or the plurality of carriers comprise FDD carriers, or TDD carriers, or at least one FDD carrier and one TDD carrier, and if the maximum HARQ process number of each of the FDD carriers is X, then the indication field comprises $\lceil \log_2 A \rceil$ bits of information, wherein A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed j, $N_1$ represents a quantity of configured or activated FDD carriers, $N_2$ represents a quantity of configured or activated TDD carriers, $N_1$ and $N_2$ are integers more than or equal to 0, $X_{max}^{TDD}$ represents a maximum one among the maximum HARQ process numbers of the respective TDD carriers, and $X_{max}$ represents a maximum one among the maximum HARQ process numbers of the respective FDD and TDD carriers; or the indication field comprises 7 bits of information; or if all the carriers are FDD carriers, then the indication field comprises 6 bits of information; or if all the carriers are TDD carriers or both FDD and TDD carriers, then the indication field comprises 7 bits of information;

in a case of the indication field comprises the HARQ process number field and the carrier indication field corresponding to the HARQ process number field, the indication field in the PDCCH indicates at least the different HARQ processes, the quantity of which is the sum of the maximum HARQ process numbers of the plurality of carriers, comprises:

approach A: the indication field comprises the HARQ process number field, and the carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field; and the one or more processors are further configured to read the computer program stored in the memory to receive the data scheduled by the PDCCH, on a carrier scheduled by the PDCCH; or approach B: the indication field comprises the HARQ process number field and the carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process are transmitted; and the one or more processors are further configured to read the computer program stored in the memory to receive the data scheduled by the PDCCH, on the carrier indicated by the carrier indication field corresponding to the HARQ process number field.

12. The data transmission apparatus according to claim 11, wherein for the approach A, the carrier indication field corresponding to the HARQ process number field comprises 1 bit of information, and two different bit states of the 1 bit of information indicate respectively that: the HARQ process/HARQ process index indicated by the HARQ process number field corresponds to an HARQ process/HARQ process index on the carrier scheduled by the PDCCH, and the HARQ process/HARQ process index indicated by the HARQ number indication field corresponds to an HARQ process/HARQ process index on a predetermined carrier; or if the PDCCH uses cross-carrier scheduling, then two different bit states of the 1 bit of information indicate respectively that: the HARQ process/HARQ process index indicated by the HARQ process number field corresponds to an HARQ process/HARQ process index on the carrier scheduled by the PDCCH, and the HARQ process/HARQ process index indicated by the HARQ number indication field corresponds to an HARQ process/HARQ process index on a carrier on which the PDCCH is transmitted.

13. The data transmission apparatus according to claim 11, wherein
the carrier indication field corresponding to the HARQ process number field comprises at least $\lceil \log_2 N' \rceil$ bits of information indicating at least N' carriers wherein N' represents the number N of configured or activated carriers or a predetermined maximum number $N_{max}$ of configured or activated carriers; or
the carrier indication field corresponding to the HARQ process number field comprises 3 bits of information.

14. The data transmission apparatus according to claim 11, wherein for the approach B, the carrier indication field corresponding to the HARQ process number field comprises 1 bit of information, and two different bit states of the 1 bit of information indicates respectively that: the data in the HARQ process indicated by the HARQ process number field are transmitted on the carrier scheduled by the PDCCH, and the data in the HARQ process indicated by the HARQ process number field are transmitted on a predetermined carrier; or if the PDCCH uses cross-carrier scheduling, then two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted.

15. The data transmission apparatus according to claim 11, wherein: the HARQ process number field indicates $X_{max}$ or $X_{max}^{FDD}$ or $X_{max}^{TDD}$ different HARQ processes, wherein $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

16. A data transmission apparatus, the apparatus comprising:
one or more processors, and a memory storing a computer program; wherein the one or more processors are configured to read the computer program stored in the memory to:
send a PDCCH comprising indication field which can indicate at least different HARQ processes, a quantity of which is a sum of maximum HARQ process numbers of a plurality of carriers, wherein data in a same HARQ process are initially transmitted and retransmitted on different carriers; and send n a data scheduled by the PDCCH;

wherein the indication field indicates jointly the quantity of HARQ processes on the carriers, or the indication field comprises an HARQ process number field and a carrier indication field corresponding to the HARQ process number field; and in a case of the indication field indicates jointly the quantity of HARQ processes on the carriers, the indication field in the PDCCH indicates at least different HARQ processes, the quantity of which is the sum of maximum HARQ process numbers of the plurality of carriers, comprises:

the plurality of carriers comprise FDD carriers, or TDD carriers, or at least one FDD carrier and one TDD carrier, and the indication field comprises $\lceil \log_2 A \rceil$ bits of information, wherein A is determined in one of:

$$A = \sum_{i=0}^{N-1} X_i, A = N \times \max_{0 \le i \le N-1}(X_i), A = N \times X_{max}^{FDD}, A = N \times X_{max}^{TDD},$$

$$A = N \times X_{max}, A = N_{max} \times \max_{0 \le i \le N-1}(X_i), A = N_{max} \times X_{max}^{FDD},$$

$$A = N_{max} \times X_{max}^{TDD}, \text{ and } A = N_{max} \times X_{max};$$

wherein i represents a carrier index, $X_i$ represents a maximum HARQ process number of a carrier indexed i, N represents a quantity of configured or activated carriers, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers, and $N_{max}$ represents a predetermined maximum number of configured or activated carriers; or the plurality of carriers comprise only FDD carriers, each of which has a same maximum HARQ process number, and the indication field comprises $\lceil \log_2 A \rceil$ bits of information, wherein A is determined in one of: $A = N \times X$, and $A = N_{max} \times X$; wherein N represents a quantity of configured or activated carriers, X represents a maximum HARQ process number of each FDD carrier, and $N_{max}$ represents a predetermined maximum number of configured or activated carriers; or the plurality of carriers comprise FDD carriers, or TDD carriers, or at least one FDD carrier and one TDD carrier, and the indication field comprises $\lceil \log_2 A \rceil$ bits of information, wherein A is determined in one of:

$$A = \sum_{i \in A1} X_i^{FDD} + \sum_{j \in A2} X_j^{TDD}, A = \sum_{i \in A1} X_i^{FDD} + N_2 \times \max_{j \in A2}(X_j^{TDD}),$$

$$A = N_1 \times \max_{i \in A1}(X_i^{FDD}) + \sum_{j \in A2} X_j^{TDD},$$

$$A = N_1 \times \max_{i \in A1}(X_i^{FDD}) + N_2 \times \max_{j \in A2}(X_j^{TDD}),$$

$$A = \sum_{i \in A1} X_i^{FDD} + N_2 \times X_{max}^{TDD}, A = N_1 \times X_{max}^{FDD} + \sum_{j \in A2} X_j^{TDD},$$

-continued $$A = N_1 \times X_{max}^{FDD} + N_2 \times X_{max}^{TDD}, A = \sum_{i \in A1} X_i^{FDD} + N_2 \times X_{max},$$

$$\text{and } A = N_1 \times X_{max} + \sum_{j \in A2} X_j^{TDD};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed j, $N_1$ represents a quantity of configured or activated FDD carriers, $N_2$ represents a quantity of configured or activated TDD carriers, $N_1$ and $N_2$ are integers more than or equal to 0, $X_{max}^{FDD}$ represents a maximum one among the maximum HARQ process numbers of the respective FDD carriers, $X_{max}^{TDD}$ represents a maximum one among the maximum HARQ process numbers of the respective TDD carriers, $X_{max}$ represents a maximum one among the maximum HARQ process numbers of the respective FDD and TDD carriers, and $N_{max}$ represents a predetermined maximum number of configured or activated carriers; or the plurality of carriers comprise FDD carriers, or TDD carriers, or at least one FDD carrier and one TDD carrier, and if the maximum HARQ process number of each of the FDD carriers is X, then the indication field comprises $\lceil \log_2 A \rceil$ bits of information, wherein A is determined in one of:

$$A = N_1 \times X + \sum_{j \in A2} X_j^{TDD}, A = N_1 \times X + N_2 \times \max_{j \in A2}(X_j^{TDD}),$$

$$A = N_1 \times X + N_2 \times X_{max}^{TDD}, \text{ and } A = N_1 \times X + N_2 \times X_{max};$$

wherein i represents a carrier index of an FDD carrier, j represents a carrier index of a TDD carrier, A1 represents a set of carrier indices of the FDD carriers, A2 represents a set of carrier indices of the TDD carriers, $X_i^{FDD}$ represents a maximum HARQ process number of the FDD carrier indexed i, $X_j^{TDD}$ represents a maximum HARQ process number of the TDD carrier indexed i, $N_1$ represents a quantity of configured or activated FDD carriers, $N_2$ represents a quantity of configured or activated TDD carriers, $N_1$ and $N_2$ are integers more than or equal to 0, $X_{max}^{TDD}$ represents a maximum one among the maximum HARQ process numbers of the respective TDD carriers, and $X_{max}$ represents a maximum one among the maximum HARQ process numbers of the respective FDD and TDD carriers; or the indication field comprises 7 bits of information; or if all the carriers are FDD carriers, then the indication field comprises 6 bits of information; or if all the carriers are TDD carriers or both FDD and TDD carriers, then the indication field comprises 7 bits of information;

in a case of the indication field comprises the HARQ process number field and the carrier indication field corresponding to the HARQ process number field, the indication field in the PDCCH indicates at least the different HARQ processes, the quantity of which is the sum of the maximum HARQ process numbers of the plurality of carriers, comprises:

approach A: the indication field comprises the HARQ process number field, and the carrier indication field corresponding to the HARQ process number field, wherein the HARQ process number field indicates an HARQ process/HARQ process index on a carrier indicated by the carrier indication field corresponding to the HARQ process number field, and the carrier indication field corresponding to the HARQ process number field indicates the carrier corresponding to the HARQ process/HARQ process index indicated by the HARQ process number field; and the one or more processors are further configured to read the computer program stored in the memory to send the data scheduled by the PDCCH, on a carrier scheduled by the PDCCH; or approach B: the indication field comprises the HARQ process number field, and the carrier indication field corresponding to the HARQ process number field, wherein the HARQ process number field indicates an HARQ process/HARQ process index on a carrier scheduled by the PDCCH, and the carrier indication field corresponding to the HARQ process number field indicates a carrier on which data in the HARQ process are transmitted; and the one or more processors are further configured to read the computer program stored in the memory to send the data scheduled by the PDCCH, on the carrier indicated by the carrier indication field corresponding to the HARQ process number field.

17. The data transmission apparatus according to claim 16, wherein for the approach A, the carrier indication field corresponding to the HARQ process number field comprises 1 bit of information, and two different bit states of the 1 bit of information indicate respectively that: the HARQ process/HARQ process index indicated by the HARQ process number field corresponds to an HARQ process/HARQ process index on the carrier scheduled by the PDCCH, and the HARQ process/HARQ process index indicated by the HARQ number indication field corresponds to an HARQ process/HARQ process index on a predetermined carrier; or if the PDCCH uses cross-carrier scheduling, then two different bit states of the 1 bit of information indicate respectively that: the HARQ process/HARQ process index indicated by the HARQ process number field corresponds to an HARQ process/HARQ process index on the carrier scheduled by the PDCCH, and the HARQ process/HARQ process index indicated by the HARQ number indication field corresponds to an HARQ process/HARQ process index on a carrier on which the PDCCH is transmitted.

18. The data transmission apparatus for according to claim 16, wherein:

the carrier indication field corresponding to the HARQ process number field comprises at least $\lceil \log_2 N' \rceil$ bits of information indicating at least N' carriers, wherein N' represents the number N of configured or activated carriers or a predetermined maximum number $N_{max}$ of configured or activated carriers; or the carrier indication field corresponding to the HARQ process number field comprises 3 bits of information.

19. The data transmission apparatus according to claim 16, wherein for the approach B, the carrier indication field corresponding to the HARQ process number field comprises 1 bit of information, and two different bit states of the 1 bit of information indicates respectively that: the data in the HARQ process indicated by the HARQ process number field are transmitted on the carrier scheduled by the PDCCH, and the data in the HARQ process indicated by the HARQ process number field are transmitted on a predetermined carrier; or if the PDCCH uses cross-carrier scheduling, then two different bit states of the 1 bit of information indicate respectively that: the data in the HARQ process indicated by the HARQ process number field are transmitted on the carrier scheduled by the PDCCH, and the data in the HARQ process indicated by the HARQ process number field are transmitted on a carrier on which the PDCCH is transmitted.

20. The data transmission apparatus for according to claim 16, wherein: the HARQ process number field indicates $X_{max}$ or $X_{max}^{FDD}$ or $X_{max}^{TDD}$ different HARQ processes, wherein $X_{max}^{FDD}$ represents the maximum one among the maximum HARQ process numbers of the respective FDD carriers, $X_{max}^{TDD}$ represents the maximum one among the maximum HARQ process numbers of the respective TDD carriers, and $X_{max}$ represents the maximum one among the maximum HARQ process numbers of the respective FDD and TDD carriers.

* * * * *